(12) United States Patent
Matsuhashi

(10) Patent No.: US 7,604,293 B2
(45) Date of Patent: Oct. 20, 2009

(54) VEHICLE SEAT STRUCTURE

(75) Inventor: Kazuhiro Matsuhashi, Fuchu-cho (JP)

(73) Assignee: Mazda Motor Corporation (JP)

( * ) Notice: Subject to any disclaimer, the term of this patent is extended or adjusted under 35 U.S.C. 154(b) by 0 days.

(21) Appl. No.: 11/806,872

(22) Filed: Jun. 5, 2007

(65) Prior Publication Data
US 2007/0284922 A1      Dec. 13, 2007

(30) Foreign Application Priority Data
Jun. 9, 2006   (JP) ............................. 2006-160586
Jun. 22, 2006  (JP) ............................. 2006-172447
Sep. 12, 2006  (JP) ............................. 2006-246429

(51) Int. Cl.
*B60N 2/42* (2006.01)

(52) U.S. Cl. .................. 297/216.2; 297/216.16

(58) Field of Classification Search ............. 297/216.2, 297/216.19, 344.15, 216.17, 216.16
See application file for complete search history.

(56) References Cited

U.S. PATENT DOCUMENTS

| | | |
|---|---|---|
| 2,227,717 A | 1/1941 | Jones |
| 2,682,931 A | 7/1954 | Young |
| 2,823,730 A * | 2/1958 | Lawrence ................. 297/216.2 |
| 6,176,543 B1 | 1/2001 | Nawata et al. |
| 2004/0160095 A1 | 8/2004 | Swierczewski |

FOREIGN PATENT DOCUMENTS

| | | |
|---|---|---|
| GB | 2347621 A | 9/2000 |
| JP | 11-115594 | 4/1999 |
| JP | 2003-276489 | 9/2003 |
| JP | 2003276489 A | 9/2003 |

OTHER PUBLICATIONS

European Search Report; EP07109682; Mailed Oct. 5, 2007.

* cited by examiner

*Primary Examiner*—Milton Nelson, Jr.
(74) *Attorney, Agent, or Firm*—Studebaker & Brackett PC; Donald R. Studebaker

(57) ABSTRACT

A vehicle seat structure, which comprises a seat cushion (10), a seat back (20) connected to a rear end of the seat cushion (10), and a downward displacement suppression device (70, 80, 90, 100) operable, when a rearward load is input into the seat back (20), to suppress a downward displacement of the seat cushion (10).

6 Claims, 16 Drawing Sheets

VEHICLE SEAT STRUCTURE

BACKGROUND OF THE INVENTION

1. Field of the Invention

The present invention relates to a vehicle seat structure, and more particularly to a vehicle seat structure having a seat cushion and a seat back connected to a rear end of the seat cushion.

2. Description of the Related Art

Heretofore, in a vehicle seat, there have been proposed various structures for absorbing impact or shock to be applied to a seat occupant during a rear collision.

For example, JP 2003-276489A (Patent Publication 1) discloses a vehicle seat comprising a seat cushion which has a front portion fixed to a floor of a vehicle body through a bracket (front leg arm), and a rear portion adapted to be moved up and down through a link member (rear leg arm), wherein the bracket is designed to be bucklingly deformed when a rearward load is imposed on the seat cushion during a rear collision, so as to allow the entire seat to be moved rearwardly to absorb a shock to be applied to a seat occupant due to the rearward load.

JP 11-115594A (Patent Publication 2) discloses a vehicle seat comprising a seat cushion, a seat back connected to a rear end of the seat cushion, and a lifter mechanism which supports each of front and rear portions of the seat cushion relative to a vehicle body through a link member and allows a height position of the supported seat cushion to be adjusted relative to the vehicle body, wherein the seat cushion has a side frame member formed with a weakened portion adapted to cause a deformation of the side frame member when a predetermined amount or more of impact load is imposed on the side frame member, so as to absorb a shock.

In the course of researches on the vehicle seats as disclosed in Patent Publications 1 and 2, the inventers found that, when a rearward load is input from a seat occupant into a seat back during a rear collision or the like, the input load is transmitted as a downward load to a seat cushion through a connecting member between the seat back and the seat cushion, and thereby the seat cushion is likely to be displaced downwardly to give a shock to the occupant due to a sudden change in his/her posture.

SUMMARY OF THE INVENTION

In view of the above problem, it is an object of the present invention to provide a vehicle seat structure capable of suppressing a downward displacement of a seat cushion during a rear collision or the like.

In order to achieve this object, the present invention provides a vehicle seat structure which comprises a seat cushion, a seat back connected to a rear end of the seat cushion, and a downward displacement suppression device operable, when a rearward load is input into the seat back, to suppress a downward displacement of the seat cushion due to a lifter mechanism. In the present invention, the vehicle seat structure provided with the downward displacement suppression device makes it possible to suppress a downward displacement of the seat cushion even if a rearward load is input into the seat back.

The above and other objects, features and advantages of the invention will become more apparent upon reading the following detailed description along with the accompanying drawings.

DESCRIPTION OF THE PREFERRED EMBODIMENTS

Figure 1:
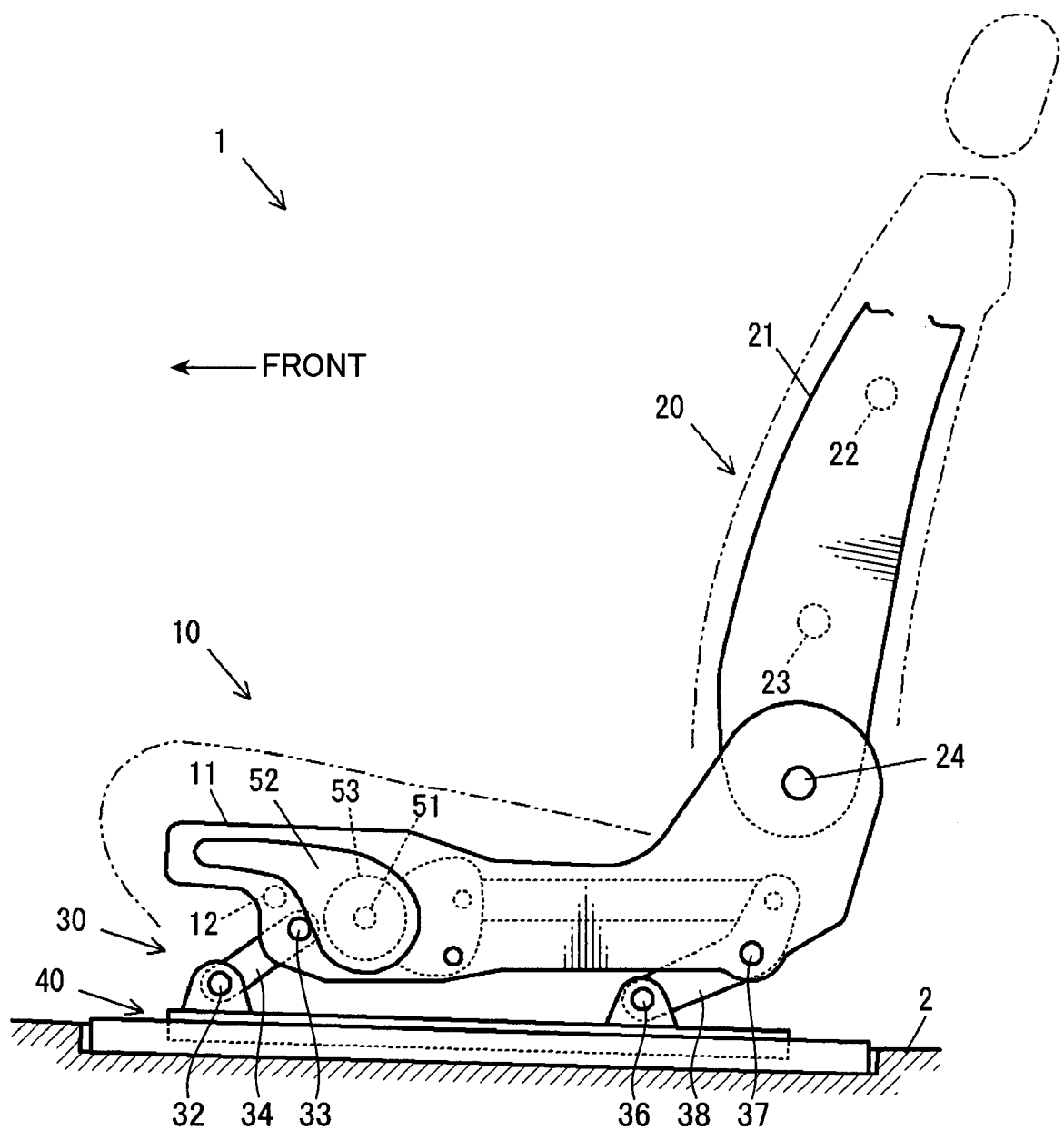
FIG. 1 is a left side view showing a vehicle seat structure according to a first embodiment of the present invention.

The present invention will now be specifically described based on various embodiments there. In the following description, the same or equivalent elements or components will be defined by a common reference numeral or code, and a redundant description will be fundamentally omitted.

First Embodiment

Figure 2:
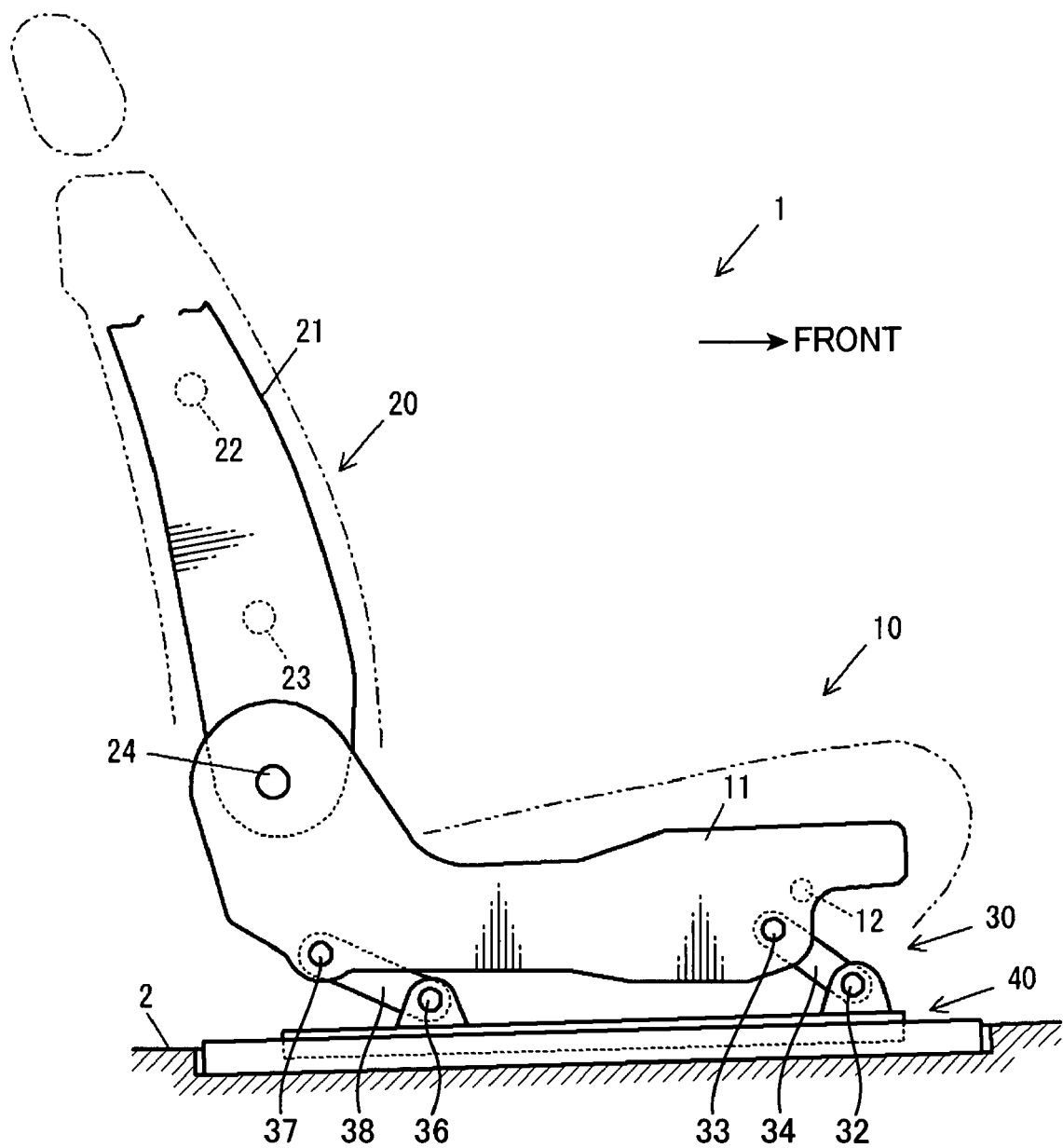
FIG. 2 is a right side view showing the vehicle seat structure according to the first embodiment.

As shown in FIGS. 1 and 2, a vehicle seat structure 1 according to a first embodiment of the present invention comprises a seat cushion 10, a seat back 20 rotatably supported by a rear portion of the seat cushion 10, a lifter mechanism 30 disposed on a lower side of the seat cushion 10 to support the seat cushion 10 and the seat back 20 relative to a vehicle body in an upwardly/downwardly movable manner, and a slide mechanism 40 supporting the lifter mechanism 30 slidably in a frontward/rearward, i.e., longitudinal, direction of the vehicle body.

The seat cushion 10 includes, as a frame member, a pair of plate-shaped right and left side frames 11, 11 disposed inside and on right and left sides of the seat cushion 10 to extend in the longitudinal direction and in approximately parallel relation to respective lateral surfaces of the seat cushion 10, a transverse frame 12 connecting between respective front portions of the right and left side frames 11, 11, and a downwardly concave-shaped seat pan (not shown) which has right and left lateral edges fixed to respective upper edges of the right and left side frames 11, 11, and an upper surface mounting thereon a cushion material. Each of the side frames 11, 11 is made of a metal material, and formed with a flange along an outer peripheral edge to provide enhanced stiffness thereto according to need.

The seat back 20 includes, as a frame member, a pair of right and left side frames 21, 21 disposed inside and on right and left sides of the seat back 20 to extend in an upward/downward direction of the vehicle body, two transverse frames 22, 23 each connecting between the right and left side frames 21, 21. Each of the side frames 21, 21 has a lower portion connected to a rear portion of a corresponding one of the side frames 11, 11 of the seat cushion 10 through a corresponding one of a pair of right and left pivot shafts 24, 24. Thus, the seat back 20 can be swingingly moved in the frontward/rearward direction about the lower portion thereof. Although not illustrated, a lock mechanism, such as a knuckle, is provided on the pivot shafts 24, 24 to rotationally lock the seat back 20 in its reclined position.

Figure 3:
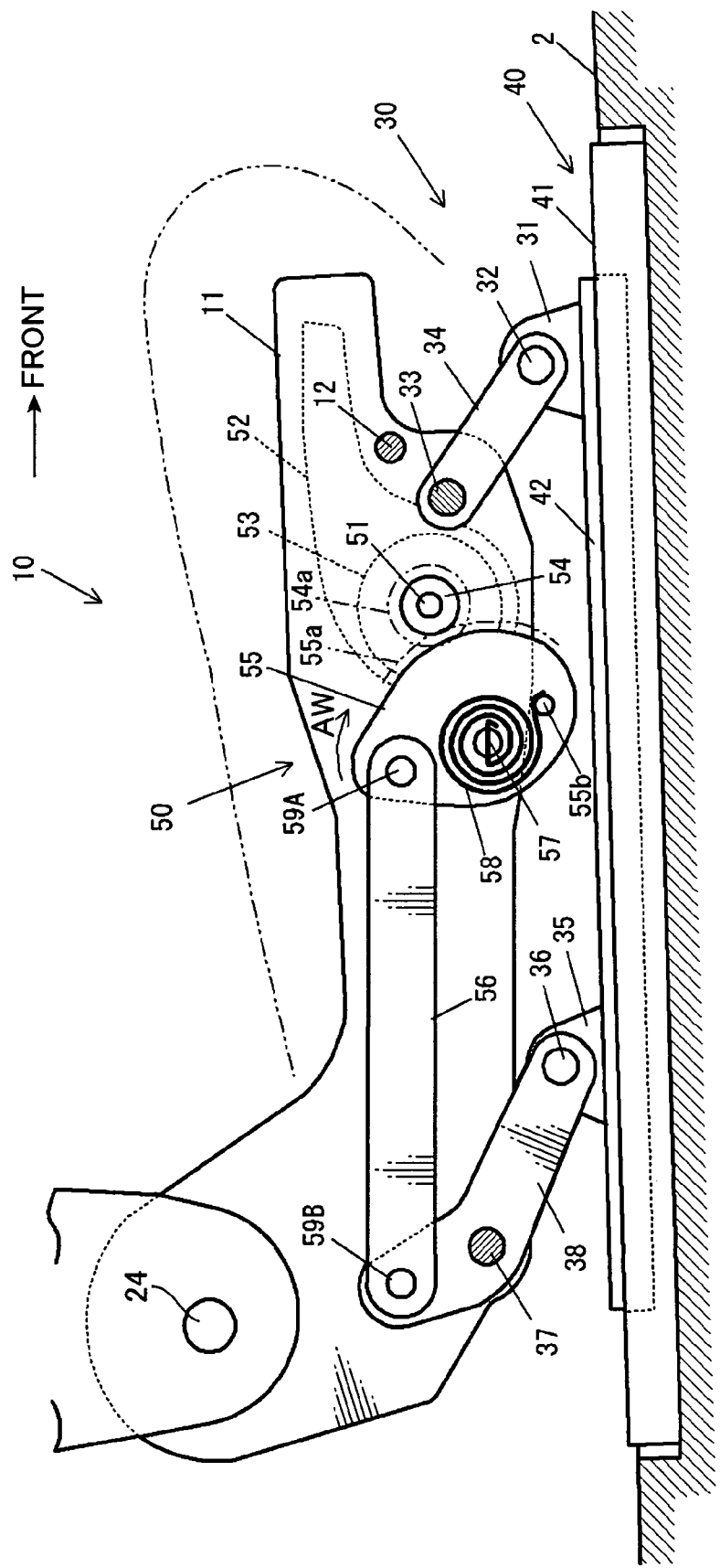
FIG. 3 is a sectional view showing the vehicle seat structure according to the first embodiment, when viewed from a lateral center of the seat toward an adjacent side door.
Figure 4:
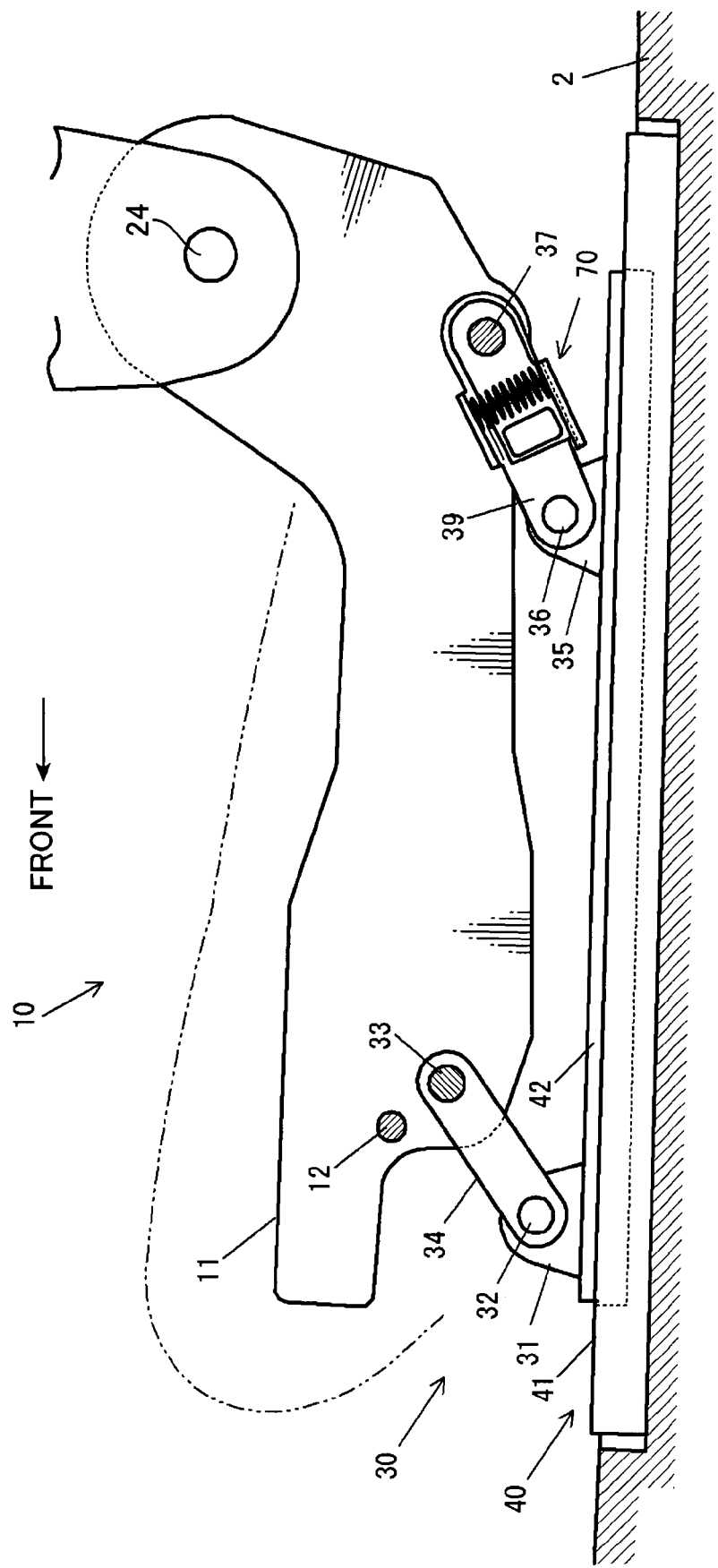
FIG. 4 is a sectional view showing the vehicle seat structure according to the first embodiment, when viewed from the lateral center of the seat toward an opposite side of the side door.

As shown in FIGS. 3 and 4, the slide mechanism 40 includes a pair of right and left lower rails 41, 41 which are fixed onto a floor 2 of the vehicle body to extend below the respective right and left side frames 11, 11 in the longitudinal direction, and a pair of right and left upper rails 42, 42 which are slidably supported by the respective right and left lower rails 41, 41 through a bearing (not shown) or the like.

The lifter mechanism 30 includes a pair of right and left front link members 34, 34 and two right and left rear link members 38, 39. Each of the front link members 34, 34 has one end connected to a corresponding one of a pair of right and left front brackets 31, 31 fixed onto respective front portions of the upper rails 42, 42, through a corresponding one of a pair of right and left coupling pins 32, 32, and the other end connected to a front lower portion of a corresponding one of the side frames 11, 11 of the seat cushion 10, through a corresponding one of a pair of right and left coupling pins 33, 33. Each of the rear link members 38, 39 has one end connected to a corresponding one of a pair of right and left rear brackets 35, 35 fixed onto respective rear portions of the upper rails 42, 42, through a corresponding one of a pair of right and left coupling pins 36, 36, and the other end connected to a rear lower portion of a corresponding one of the side frames 11, 11 of the seat cushion 10, through a corresponding one of a pair of right and left coupling pins 37, 37. The lifter mechanism 30 is designed to swingingly move the link members 34, 34, 38, 39 in the frontward/rearward directions about the coupling pins 32, 32, 36, 36 so as to adjust a height position of the seat cushion 10 relative to the floor 2 and a longitudinal position of the seat cushion 10. As seen in FIGS. 1 to 4 where the seat cushion 10 is adjusted to a lowermost position, the lifter mechanism 30 is designed to position each of the rear link members 38, 39 and the front link members 34, 34 in a rearwardly inclined posture when the seat cushion 10 is adjusted to the lowermost position. When the seat cushion 10 is adjusted to an uppermost position, the seat cushion 10 will be moved upwardly and frontwardly relative to the position illustrated in FIGS. 1 to 4. Exactly, each of the pairs of right and left coupling pins 33, 33 and right and left coupling pins 37, 37 are formed to extend in a width, i.e., lateral, direction of the vehicle body and connected together (i.e., formed as a single rod member) to allow the right and left side frames 11, 11 to be moved up and down in an interlocked manner. These coupling pins 33, 33, 37, 37 also serve as a frame extending laterally between the right and left side frames 11, 11. The present invention can also be applied to a lifter mechanism designed to position front and rear link members in a further rearwardly inclined posture as compared with that in FIGS. 1 to 4 (i.e., a rearwardly extending posture) when the seat cushion 10 is adjusted to the lowermost position.

As shown in FIG. 3, the lifter mechanism 30 includes a lifter operating section 50 adapted to move the seat cushion upwardly and downwardly.

This lifter operating section 50 is provided to only one of the right and left side frames 11, 11, which is located adjacent to a side door of the vehicle body (this side frame and the other side frame will hereinafter referred to respectively as "adjacent side frame" and "remote side frame"). The lifter operating section 50 includes a manual operation lever unit 53 attached onto an outer surface of the adjacent side frame 11 to support a manual operation lever 52 rotatably about an operation shaft 51 extending in the lateral direction. The lifter operating section 50 is designed to transmit an operating force from the manual operation lever 52 to the rear link members 38 while converting a rotational movement of the operation shaft 51 to a longitudinal linear movement through a transfer gear 54 fixed to an inner end of the operation shaft 51, a sector gear 55 rotatably supported by the adjacent side frame 11, and a longitudinal link member 56 connected to the sector gear 55.

Figure 5:
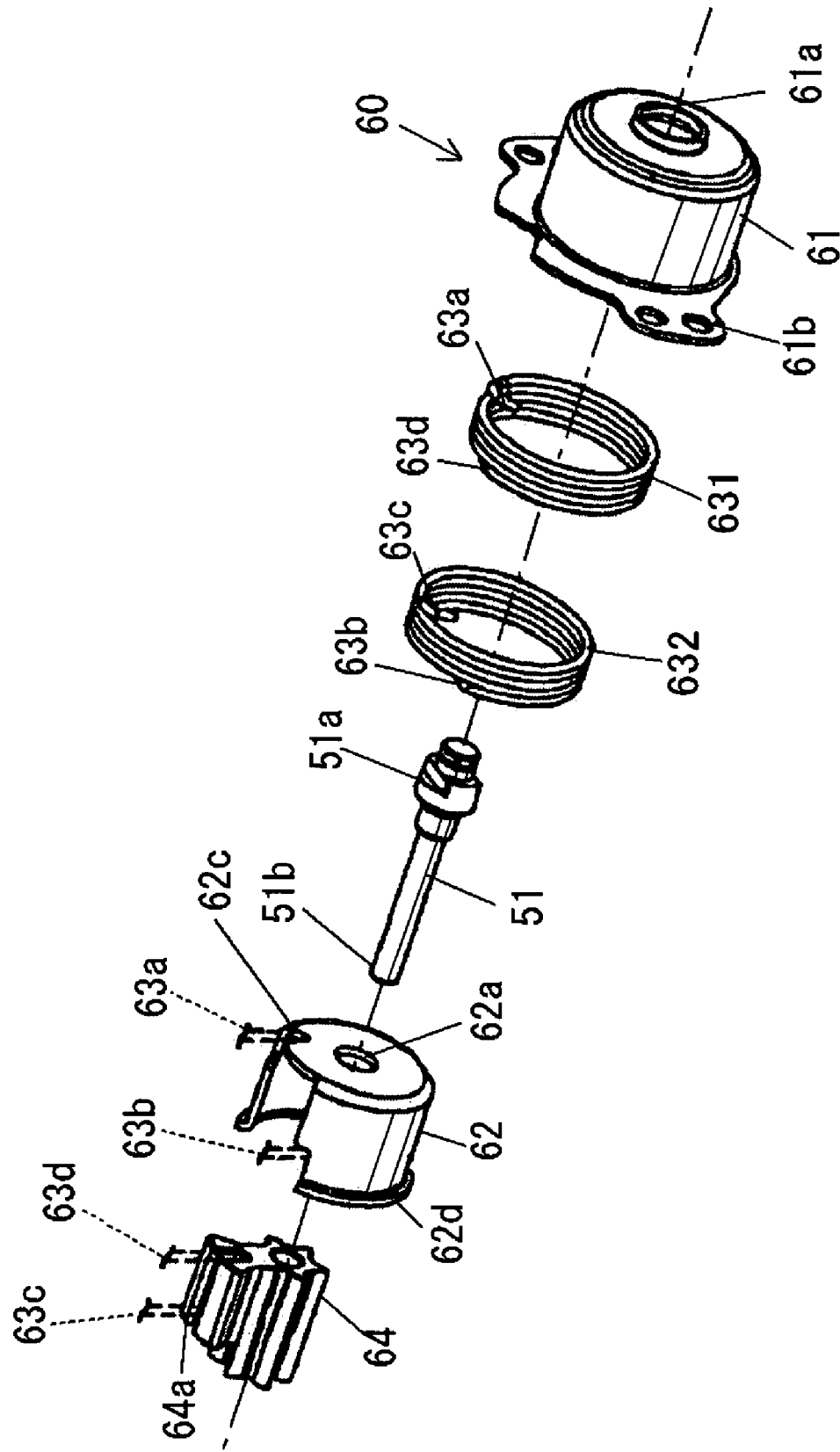
FIG. 5 is an exploded perspective view showing a drum brake of a lifter mechanism in the vehicle seat structure according to the first embodiment.

The manual operation lever unit 53 internally has a drum brake 60 illustrated in FIG. 5 which serves as a retention mechanism unit (FIG. 5 is an exploded perspective view showing the drum brake 60). The drum brake 60 is fixed to the outer surface of the adjacent side frame 11 provided with the manual operation lever 52. As shown in FIG. 5, the drum brake 60 comprises an inner casing 62, an outer casing 61 having a flange 61b fixed to the outer surface of the adjacent side frame 11 by a rivet or the like, and two brake springs 631, 632 each connected between the outer casing 61 and the inner casing 62. The operation shaft 51 has an outward shaft portion 51a supported by a center hole 61a of the outer casing 61, and an inward shaft portion 51b supported by an insertion hole formed in the adjacent side frame 11. A pinion 64 is rotatably fitted on an intermediate region of the operation shaft 51. The inner casing 62 is fixed to the operation shaft 51 having the outward shaft portion 51a inserted into the center hole 62a of the inner casing 62.

The brake spring 631 has one end 63a engaged with an incised portion 62c of the inner casing 62, and the other end 63d engaged with a slit 64a of the pinion 64. The brake spring 632 has one end 63c engaged with the slit 64a of the pinion 64 and the other end 63b engaged with an incised portion 62d of the inner casing 62.

As above, the drum brake 60 has a conventional structure designed such that, a rotation of the operation shaft 51 caused by an operating force from the side of the manual operation lever 52 acts on the ends 63b, 63d (or 63c, 63a) of the brake springs 631, 632 to reduce respective diameters of the brake springs 631, 632 so as to allow the inner casing 62 to be rotated, and a rotation of the operation shaft 51 caused by a force from the pinion 64 acts on the ends 63c, 63a (or 63b, 63d) of the brake springs 631, 632 to increase the diameters of the brake springs 631, 632 so that the brake springs 631, 632 come into contact with an inner peripheral surface of the outer casing 61 to preclude the inner casing 62, i.e., the operation shaft 51, from being rotated. That is, the drum brake 60 is operable to apply a braking force for preventing the operation shaft 51 from being rotated by a load from the side of the seat cushion 10.

Returning to FIG. 3, the sector gear 55 is supported by the adjacent side frame 11 rotatably about a support shaft 57 which is located on a rearward and lower side of the operation shaft 51 of the manual operation lever 51. The sector gear 55 has a front outer peripheral portion formed with external teeth 55a which are engaged with external teeth 54a of the transfer gear 54. The support shaft 57 of the sector gear 55 is associated with a wound spring 58 which has an inner end fixed to the support shaft 57 and an outer end fastened to a lock member 55 provided in a lower portion of the sector gear 55. Thus, the wound spring 58 applies a biasing force to the sector gear 55 in a clockwise direction in FIG. 3 as indicated by the arrow AW.

The longitudinal link member 56 has a front end connected to an upper portion of the sector gear 55 through a coupling pin 59A, and a rear end connected to an upper end of an upward extension portion of the rear link member 38 through a coupling pin 59B.

The lifter mechanism 30 having the above structure is likely to cause the following problem. In the event of a rear collision (i.e., a vehicle collision where a vehicle is rear-ended by another vehicle), a portion of the seat cushion 10 on the side of the remote side frame 11 is displaced downwardly in whole. The reason is that the lifter operating section 50 is disposed on the side of the adjacent side frame 11 of the seat cushion 10 as described above, and therefore a change in posture of the rear link member 38 (swing movement about a portion of the rear link member 38 on the side of the floor 2) is restricted by the drum brake 60 through the longitudinal link member 56, whereas such restriction is not imposed on the front and rear link member 34, 38 on the side of the remote side frame 11, and therefore the front and rear link member 34, 38 are susceptible to external force or the like. Further, when a rearward load applied to the seat back 20 is increased, the load is transmitted as a downward load to a rear portion of the seat cushion 10, particularly to the rear link members 38, 39, through the pivot shafts 24, 24 to cause a deformation in the rear link members 38, 39 or a deformation in the components of the drum brake 60. Consequently, the rear portion of the seat cushion 10 will be largely displayed downwardly relative to a front portion thereof.

Considering this problem, in the first embodiment, a downward displacement suppression device 70 is provided in the lifter mechanism 30 to suppress a downward displacement of the seat cushion 10.

Figure 6:
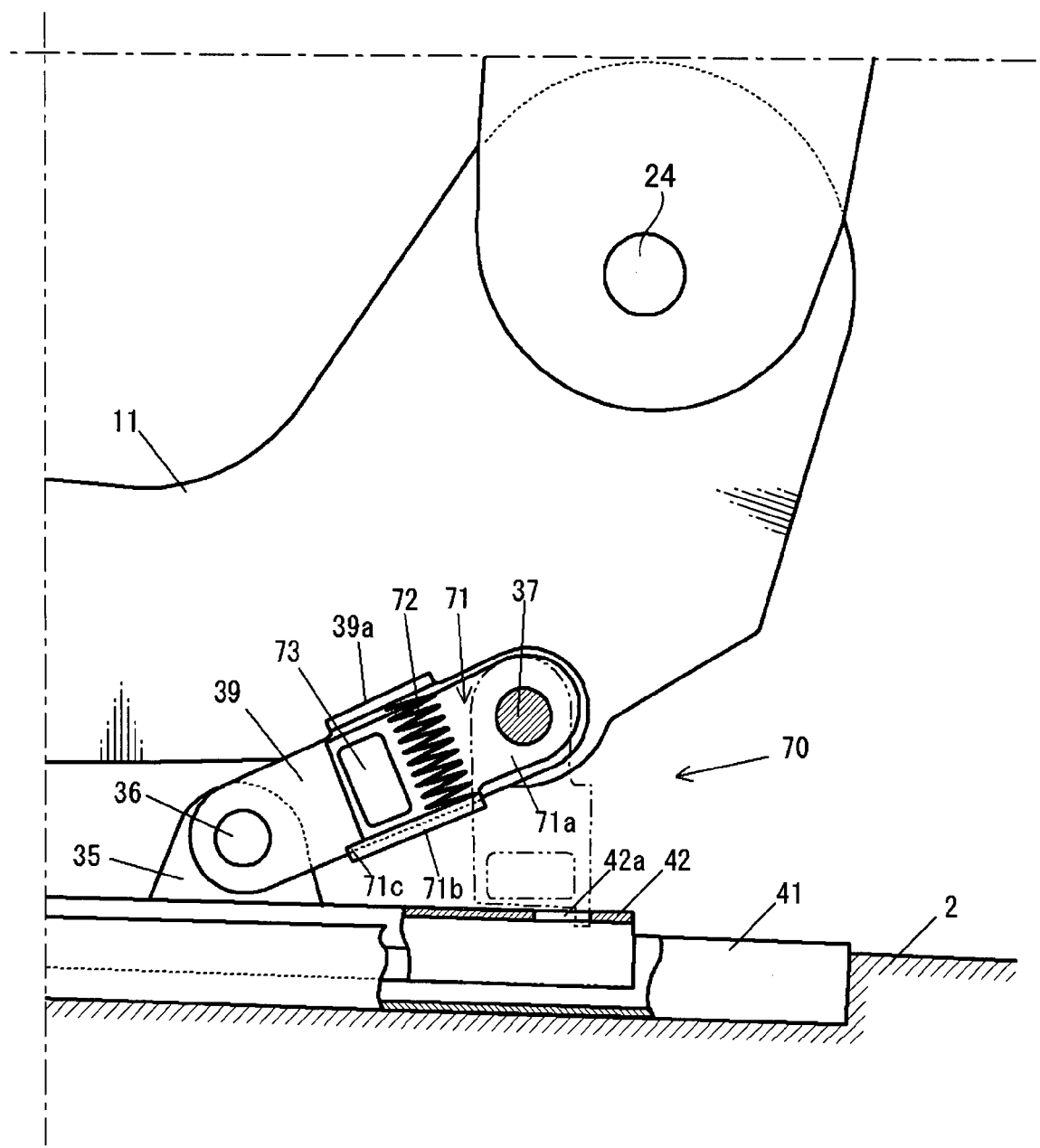
FIG. 6 is an enlarged view showing a downward displacement suppression device in the vehicle seat structure according to the first embodiment.

This downward displacement suppression device 70 is disposed on the side of the remote side frame 11 of the seat cushion 10. As shown in FIG. 6, the downward displacement suppression device 70 includes a swingable member 71 adapted to be swingingly moved about the coupling pin 37 for the rear link member 39. The swingable member 71 has a body portion 71a with a surface parallel to the rear link member 39, and a spring receiving portion 71b extending from a front end of a lower edge of the body portion 71a toward an inward side of the seat. Correspondingly, the rear link member 39 is formed with a spring receiving portion 39a extending from an upper edge of an intermediate portion thereof between the coupling pins 36, 37 toward the inward side of the seat. A spring member 72 is attached between the spring receiving portions 39a, 71b. In a normal position indicated by the solid lines in FIGS. 4 and 6, the spring member 72 applies a biasing force to the spring receiving portions 39a, 71b to prevent the spring receiving portions 39a, 71b from being moved away from each other. Thus, in a normal state, a front upper edge (edge on the side of the spring receiving portion 39a in FIG. 6) of the swingable member 71 comes into contact with the spring receiving portion 39a to keep the swingable member 71 in the position illustrated in FIG. 6. The biasing force is set at a value which allows the swingable member 71 to be swingingly moved when a predetermined amount or more of rearward load is applied to the seat back 20, while preventing the swingable member 71 from being swingingly moved by acceleration of the vehicle and minor vibrations.

Further, a weight member 73 is fixedly attached to a lower region of the body portion 71a of the swingable member 71.

The spring receiving portion 71b of the swingable member 71 has a front end extending frontwardly relative to a front edge of the body portion 71a in the normal position (a lower end extending downwardly relative to a lower edge of the body portion 71a in an after-mentioned post-collision position), and the upper rail 42 of the slide mechanism 40 has an upper surface with an elongate hole 42a extending in a longitudinal direction of the upper rail 42. This elongate hole 42a is located on a locus of a swing movement of the swingable member 71 (in top plan view), and formed to have a width (lateral length) greater than that of the lower end 71c of the spring receiving portion 71b of the swingable member 71. Thus, when the swingable member 71 is swingingly moved about the coupling pin 37 to a post-collision position as indicated by the two-dot chain line in FIG. 6, the lower end 71c of the spring receiving portion 71b is fitted into the elongate hole 42a and brought into contact with a rear end of the elongate hole 42a, to stop the swing movement of the swingable member 71 at a post-collision position where a longitudinal direction of the swingable member 71 is approximately aligned with a vertical direction.

An operation of the vehicle seat structure according to the first embodiment will be described below.

The weight member 73 is fixedly attached to the lower region of the body portion 71a of the swingable member 71, as described above. Thus, for example, in the event of a rear collision, a rearward force is applied to the weight member 73, and the swingable member 71 starts having a rearward swing movement when the rearward force becomes greater than the biasing force of the spring member 72. Then, when the lower end 71c of the spring receiving portion 71b of the swingable member 71 is fitted into the elongate hole 42a of the upper rail 42 and brought into the rear end of the elongate hole 42a, the swing movement is stopped at a position where the longitudinal direction of the swingable member 71 is approximately aligned with a vertical direction, i.e., the swingable member 71 serves as a shoring rod. In this manner, a downward displacement of the rear portion of the seat cushion 10 due to a deformation of the lifter operating section 50 during the rear collision can be suppressed by the downward displacement suppression device 70.

The lifter mechanism 30 is designed to position each of the rear link members 38, 39 and the front link members 34, 34 in a rearwardly inclined posture when the seat cushion 10 is adjusted to the lowermost position. Thus, when the seat cushion 10 is adjusted to a higher position, it can be moved frontwardly to provide enhanced seat position (sitting posture) adjustability for an occupant having a relatively small build. In addition, the front link members 34, 34 and the rear link members 38, 39 make up a parallel linkage to achieve further enhanced seat position adjustability. Even in such a parallel linkage arrangement, the downward displacement suppression device 70 can effectively prevent the link members from being further inclined rearwardly, in an indirect manner.

Specifically, in a parallel linkage arrangement, a rearward load input into the seat back 20 is more likely to cause an increase in rearward inclination of each of the rear link members 38, 39 and the front link members 34, 34. In the first embodiment, the downward displacement suppression device 70 can prevent such a further rearward inclination of the rear link member 39 to suppress a downward displacement of the seat cushion 10.

In addition, the downward displacement suppression device 70 can be practically achieved only using a small number of additional components, such as the swingable member 71, the spring member 72 and the weight member 73.

Furthermore, the downward displacement suppression device 70 is designed to exert no influence on an operating force of the lifter operating section 50. Thus, a downward displacement of the seat cushion 10 can be suppressed without deterioration in operation performance.

In the above structure, the drum brake 60 is provided in the seat cushion 10 only on the side of the side door (i.e., only on the side of the adjacent side frame 11). Thus, a portion of the seat cushion 10 on the side of the adjacent side frame 11 is likely to have a downward displacement less than that on the side of the remote side frame 11 having only the parallel linkage. With this point in view, the downward displacement suppression device 70 is arranged on the side of the remote side frame 11 of the seat cushion 10. This arrangement makes it possible to suppress a downward displacement of the seat cushion 10 with a desirable balance between right and left sides and in an efficient manner without providing the downward displacement suppression device 70 to both sides.

Second Embodiment

Figure 7:
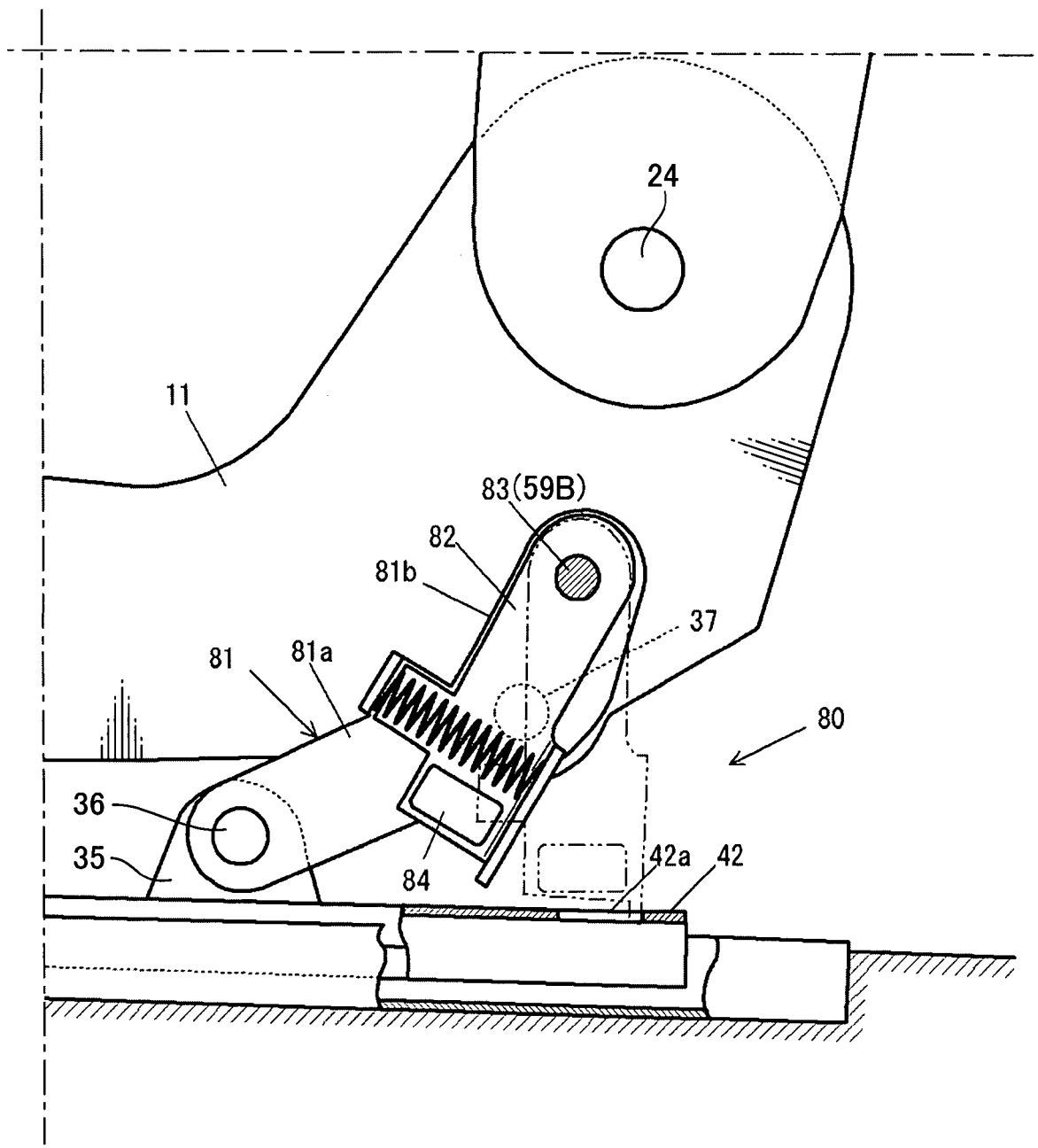
FIG. 7 is an enlarged view showing a downward displacement suppression device in a vehicle seat structure according to a second embodiment of the present invention, which corresponds to FIG. 6.

A vehicle seat structure according to a second embodiment of the present invention is designed to have a downward displacement suppression device 80 as shown in FIG. 7. In the vehicle seat structure according to the second embodiment, a rear link member 81 connected to a rear bracket 35 at a front end thereof through a coupling pin 36 has a body portion 81a, and an extension portion 81a extending upwardly from an upper edge of the body portion 81a. The downward displacement suppression device 80 includes a swingable member 82 connected to an upper end of the extension portion 81b through a coupling pin 83. In this structure, a coupling pin 37 which couples a rear link member located adjacent to a side door to an adjacent side frame 11 (i.e., a side frame located adjacent to the side door) is not connected to the rear link member 81 on the side of a remote side frame 11 (i.e., a side frame located on the opposite side of the adjacent side frame 11), and the rear link member 81 is connected to the aforementioned coupling pin 59B (see FIG. 3 in the first embodiment) through the coupling pin 83 located on an upward and rearward side relative to a coupling pin 37 which couples the rear link member 81 to the remote side frame 11. This makes it possible to increase a distance between the coupling pin 83 and a weight member 84 so as to provide a larger angular moment to allow the same swing movement as that in the first embodiment to be obtained without increasing a weight of the weight member 84. In addition, the extension portion 81b is arranged to extend in a direction closer to vertical than the body portion 81a, in a normal position. Thus, a time period from the initiation of swing movement of the swingable member 82 through until the swingable member 82 is fitted into an elongate hole 42a of an upper rail 42 can be reduced to further reliably suppress a downward displacement of a seat cushion 10.

Third Embodiment

Figure 8:
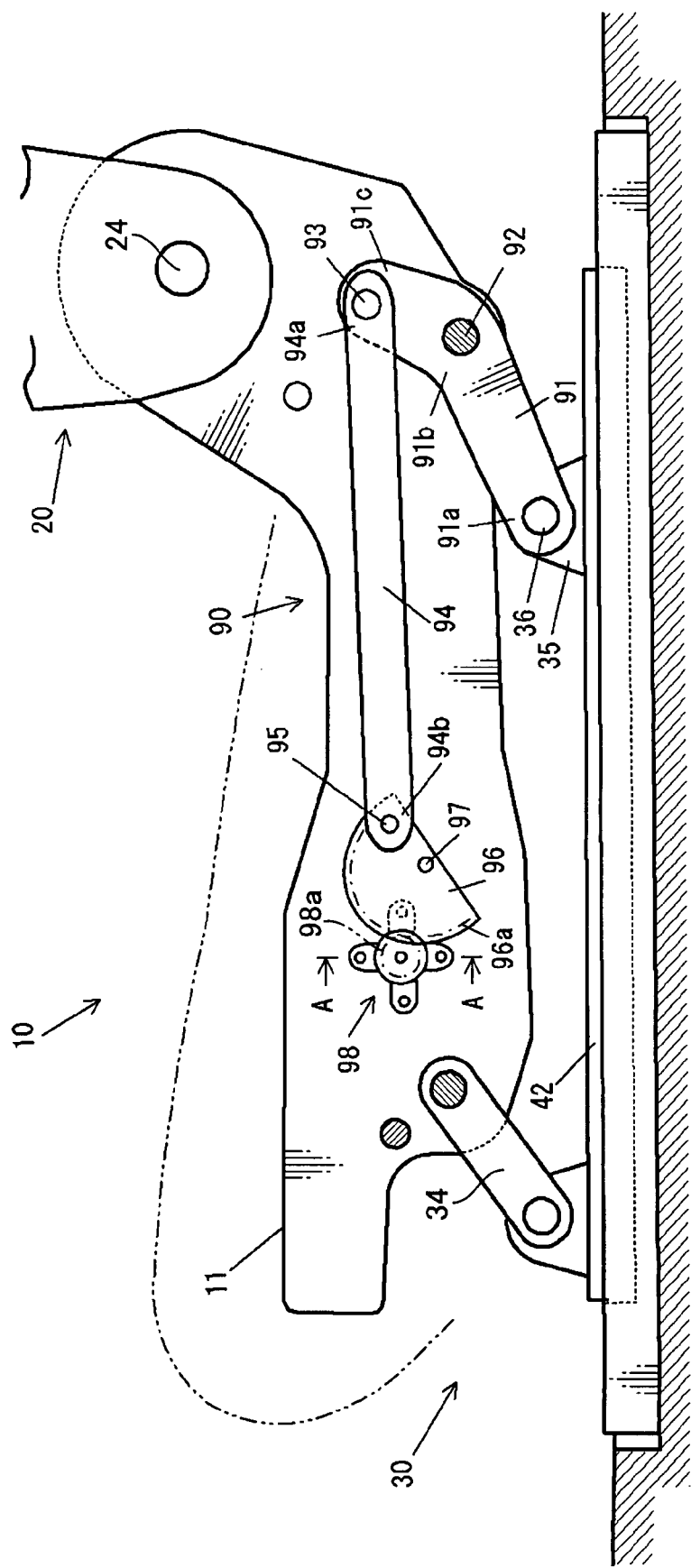
FIG. 8 is a sectional view showing a downward displacement suppression device in a vehicle seat structure according to a third embodiment of the present invention, when viewed from a lateral center of the seat toward an opposite side of an adjacent side door.
Figure 9:
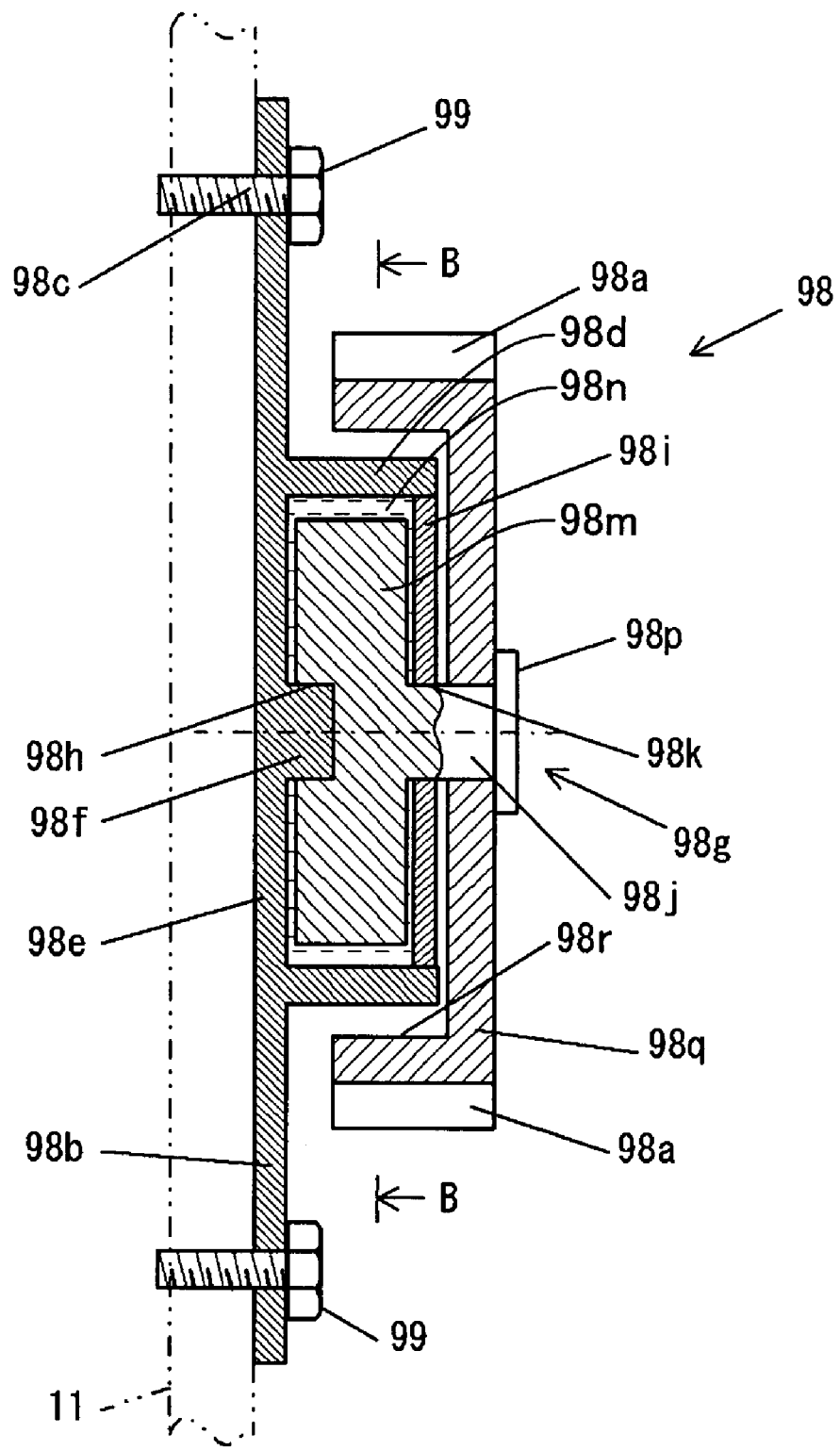
FIG. 9 is a sectional view taken along the line A-A in FIG. 8.
Figure 10:
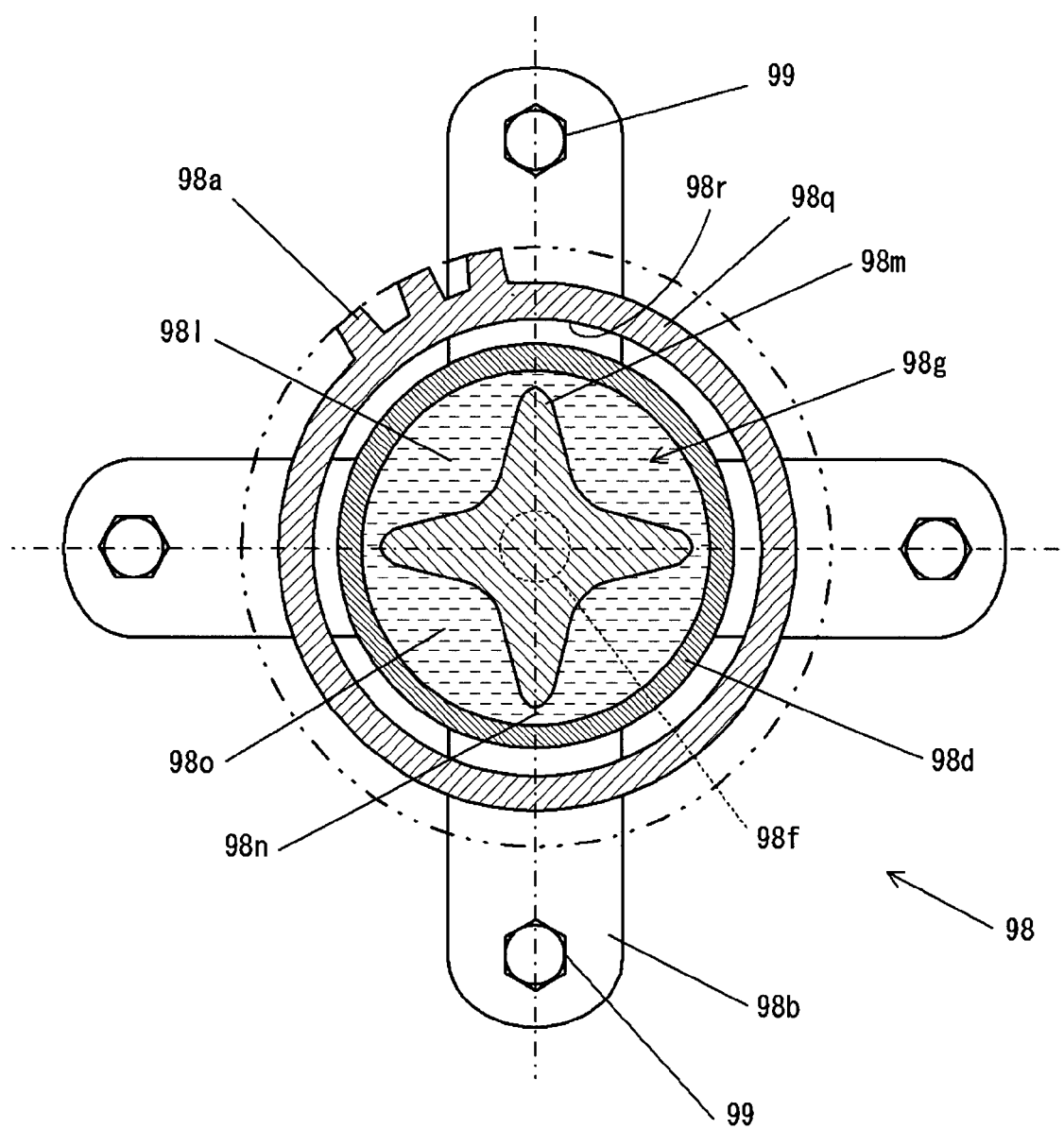
FIG. 10 is a sectional view taken along the line B-B in FIG. 9.

A vehicle seat structure according to a third embodiment of the present invention is designed to have a downward displacement suppression device 90 as shown in FIGS. 8 to 10.

In the third embodiment, the downward displacement suppression device 90 comprises a rotary damper 98 associated with a gear member 96 which is pivotally connected to a side frame (remote side frame) 11 through a support shaft and connected to a longitudinal link member 94 through a coupling pin 95. A rear link member 91 is formed in an approximately L shape which has one end 91a connected to a rear bracket 35 fixed onto a rear portion of an upper rail 42, through a coupling pin 36, a curved portion 91b connected to a rear lower portion of the side frame 11 through a coupling pin 92, and the other end 91c connected to one end 94a of the longitudinal link member 94 through a coupling pin 93. The longitudinal link member 94 is formed as an approximately-linear plate-shaped member, and the other end 94b of the longitudinal link member 94 is connected to the gear member 96 through the coupling pin 95. The gear member 96 pivotally connected to the side frame 11 through the support shaft 97 has a gear portion 96a engaged with a gear portion 98a of the rotary damper 98.

A connection position of the coupling pin 95 and dimensions of the gear member 96 are determined to allow the engagement between the gear portion 96a of the gear member 96 and the gear portion 98a of the rotary damper 98 to be maintained even if a seat cushion 10 in an uppermost position or a lowermost position receives a predetermined load or more.

As shown in FIGS. 9 and 10, the rotary damper 98 is fixed to the vertical side frame 11 by a bolt 99 inserted through a mounting hole 98c formed in a base 98b thereof. The base 98b is formed with a cylindrical-shaped peripheral wall 98d. The base 98b is further formed with a spindle 98f which protrudes from a bottom surface 98e of the an internal space surrounded by the peripheral wall 98d, in coaxial relation to the peripheral wall 98d. A rotor 98g is disposed in the internal space of the peripheral wall 98d rotatably relative to the peripheral wall 98d. The rotor 98g has a bottom surface formed with a concave portion 98h, and the spindle 98f is fitted into the concave portion 98h. Thus, the rotor 98g is received in the base 98b (i.e., the internal space of the peripheral wall 98d) rotatably relative to the spindle 98f and coaxially with the spindle 98f while maintaining a predetermined clearance between the rotor 98g and an inner surface of the peripheral wall 98d. The peripheral wall 98d of the base 98b which receives the rotor 98g therein has a cap 98i fixed to a distal end thereof. The cap 98i may be fixed to the peripheral wall 98d in a threading or press-fitting manner. The cap 98i is formed with a center hole 98k allowing a shank 98j of the rotor 98g to be inserted therethrough. A space surrounded by the rotor 98g and the bottom surface 98e, the peripheral wall 98d and the cap 98i of the base 98b is filled with oil 98l. A part of the space is formed as a gap between a distal end of a blade portion 98m of the rotor 98g and the inner surface of the peripheral wall 98d, to serve as an orifice 98n, and the remaining space serves as an oil chamber 98o. The rotary damper 98 further includes a gear member 98q which has a peripheral wall 98r disposed outside an outer surface of the peripheral wall 98d rotatably relative to the peripheral wall 98d and coaxially with the peripheral wall 98d. The gear portion 98a of the rotary damper 98 is formed on an outer peripheral surface of the peripheral wall 89r of the gear member 98q. The gear member 98q is fixedly attached to the shank 98j formed to extend along a rotation axis of the rotor 98g, so as to allow the rotor 98g to be rotated in conjunction with a rotation of the gear member 98q. A fastener 98p, such as a nut, is fixed to a distal end of the shank 98j to fix the gear portion 98j in a predetermined position. Although not illustrated, an oil leakage preventing mechanism is provided in a sliding area between the shank 98j and the cap 98i.

In the above rotary damper 98, when the blade portion 98m of the rotor 98g is rotated, the oil 98l is moved from the oil chamber 98o to the orifice 98n. During this process, a damping or braking force is produced by viscous resistance of the oil 98l, and applied to a rotation of the rotor 98g through the blade portion 98m.

An operation of the vehicle seat structure according to the third embodiment will be described below.

For example, when a vehicle is rear-ended by another vehicle, a rearward load is input into a seat back 20, and the input load is transferred to a seat cushion 10 as a load causing a downward displacement of a seat cushion 10. Due to this load, the end 91c of the rear link member 91 is inclined in a rearward direction of the vehicle about the end 91a, and thereby the longitudinal link member 94 connected to the end 91c is moved in the rearward direction. Thus, the load is transmitted to the gear member 96 connected to the end 94b of the longitudinal link member 94. The transmitted load is converted to a turning force causing a clockwise (in FIG. 8) rotation of the gear member 96 about the support shaft 97 to rotate the gear portion 96a in a clockwise direction about the support shaft 97. This turning force is transmitted to the gear portion 98a of the rotary damper 98 engaged with the gear portion 96a to rotate the gear portion 98a in a clockwise direction. The turning force transmitted to the gear portion 98a is transmitted to the rotor 98g housed in the base, through the shank 98j, to rotate the rotor 98g in a counterclockwise (in FIG. 10) direction. During this process, the rotor 98g receives a braking force produced by viscous resistance of the oil 98l in proportion to a rotational speed of the rotor 98g, and therefore a rotation of the rotor 98g is suppressed.

In this manner, the braking force becomes larger as the turning force, i.e., an angular velocity, input into the rotary damper 98, is increased. That is, a speed of a downward displacement of the seat cushion 10 will be suppressed to a lower value as a load as a source of the turning force becomes larger. On the other hand, when an angular velocity input into the rotary damper 98 has a relatively low value, the braking force also has a relatively low value. Thus, when the seat cushion 10 is slowly displaced, for example, during a manual operation of moving the seat cushion 10 upwardly or downwardly, the movement of the seat cushion 10 is never suppressed.

In the third embodiment, the braking force is produced when the seat cushion 10 is rapidly displaced downwardly. This makes it possible to stably obtain a desired effect irrespective of a height position of the seat cushion 10.

In addition, the downward displacement suppression device 90 can be practically achieved only using a small number of additional components, such as the longitudinal link member 94, the gear member 96 and the rotary damper 98.

The vehicle seat structure according to the third embodiment includes a lifter mechanism 30 equipped with a lifter operating section 50 adapted to adjust a height position of the seat cushion 10 relative to a vehicle body. Thus, the seat cushion 10 can be adjusted to a sitting position suitable for a physical size of an occupant to provide enhanced seat position adjustability for an occupant.

Fourth Embodiment

Figure 11:
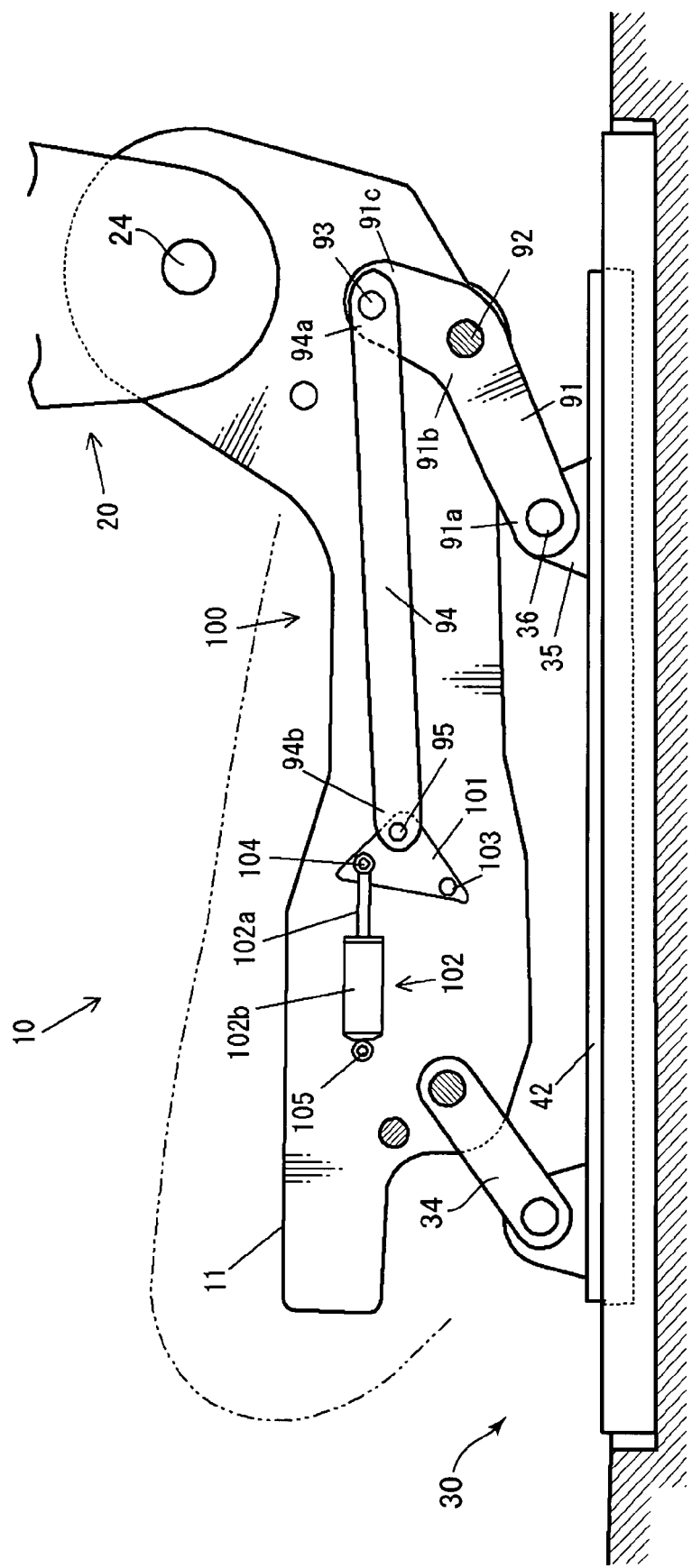
FIG. 11 is a sectional view showing a downward displacement suppression device in a vehicle seat structure according to a fourth embodiment of the present invention, when viewed from a lateral center of the seat toward an opposite side of an adjacent side door.

A vehicle seat structure according to a fourth embodiment of the present invention is designed to have a downward displacement suppression device 100 which comprises a connection member 101 and a shock absorber 102, as shown in FIG. 11, instead of the aforementioned downward displacement suppression device 90 comprising the gear member 96 and the rotary damper 98.

In the downward displacement suppression device 100 for the vehicle seat structure according to the fourth embodiment, a longitudinal link member 94 has one end 94a connected to a rear link member 91 through a coupling pin 93, and the other end 94b rotatably connected to the connection member 101 through a coupling pin 95. The connection member 101 is formed in a triangular shape in side view, and connected to a side frame (remote side frame) 11 pivotally and rotatably through a support shaft 103. The shock absorber 102 includes a piston rod 102a having a distal end rotatably connected to the connection member 101 through a coupling pin 104. The shock absorber 102 also includes a cylinder 102b having a base end connected to the side frame 11 pivotally and rotatably through a coupling pin 105.

In the shock absorber 102, when the piston rod 102a is reciprocatingly moved relative to the cylinder 102b, oil contained in the cylinder 102b is moved through an orifice (not shown) in the cylinder 102b. During this process, a damping or braking force produced by viscous resistance of the oil is applied to the movement of the piston rod 102a. This braking force is produced in proportion to a speed of the piston rod 102a, and varied depending on a viscosity of the oil.

In the fourth embodiment, for example, when a vehicle is rear-ended by another vehicle, a rearward load is input into a seat back 20, and the input load is transferred to the connection member 101 through a seat cushion 10, the rear link member 91 and the longitudinal link member 94, in the same manner as that described in the third embodiment. The transmitted load is converted to a turning force causing a clockwise rotation of the connection member 101 about the support shaft 103, and this turning force is transmitted to the piston rod 102a in a direction for pulling the piston rod 102a. The pulling force transmitted to the piston rod 102a applies a pressure to the oil in the cylinder 102b in such a manner as to move the oil through the orifice. During this process, a braking force produced by viscous resistance of the oil is applied to the movement of the piston rod 102a.

In this manner, the braking force becomes larger as the pulling force, i.e., speed, input into the shock absorber 102 is increased. That is, a speed of a downward displacement of the seat cushion 10 will be suppressed to a lower value as a rearward load as a source of the pulling force becomes larger. On the other hand, when a speed input into the shock absorber 102 has a relatively low value, the braking force also has a relatively low value. Thus, when the seat cushion 10 is slowly displaced, for example, during a manual operation of moving the seat cushion 10 upwardly or downwardly, the movement of the seat cushion 10 is never suppressed.

In the first to fourth embodiments, the slide mechanism is directly mounted on the floor. Alternatively, the lower rail may be mounted to the floor through a seat mount bracket which supports respective front and rear ends of the right and left lower rails at a position above the floor.

Fifth Embodiment

A vehicle seat structure according to a fifth embodiment of the present invention will be described below.

Figure 12:
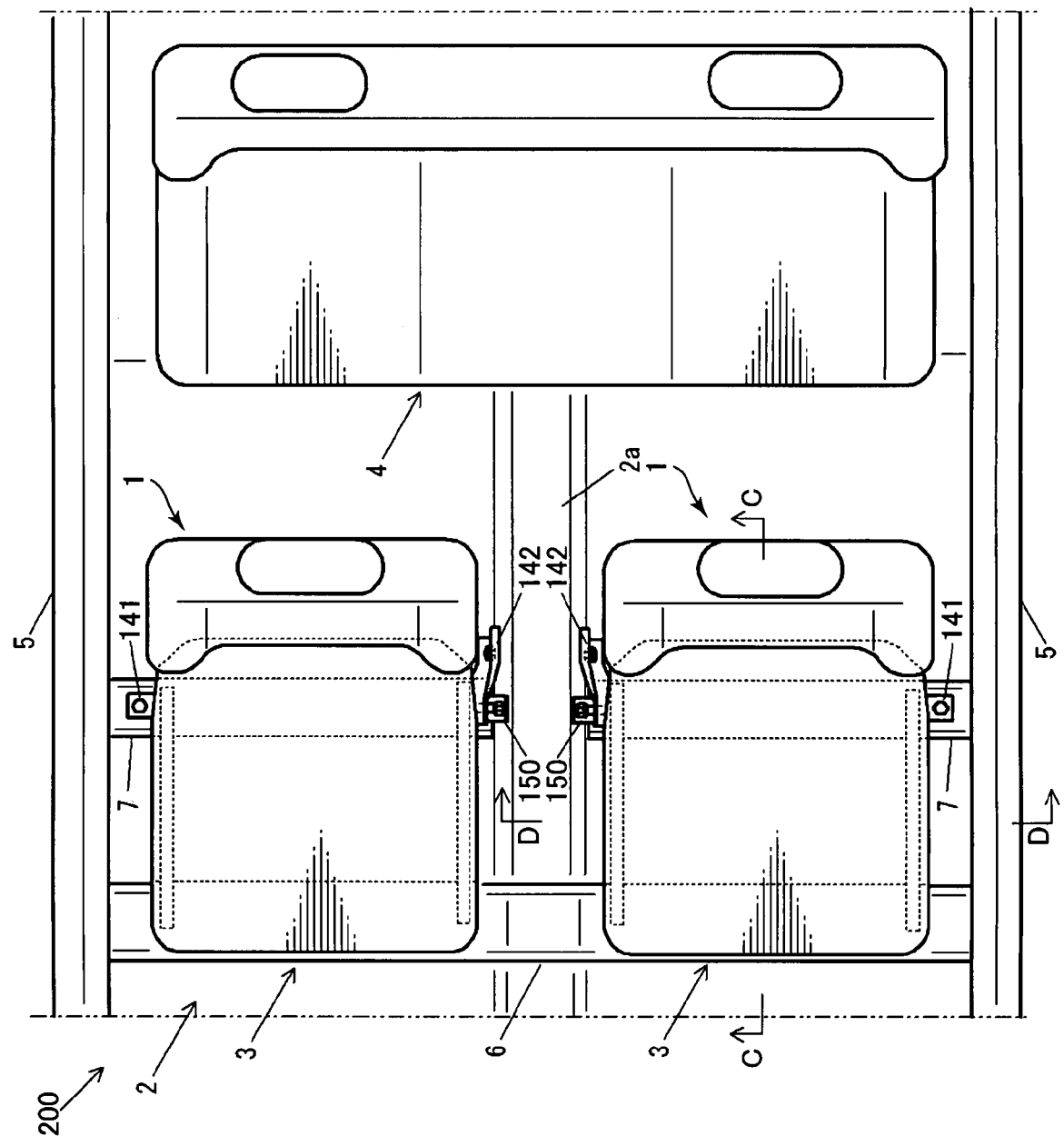
FIG. 12 is a top plan view showing an occupant compartment of a vehicle equipped with a vehicle seat structure according to a fifth embodiment of the present invention.

As shown in FIG. 12, two right and left seats 3, 3 and a rear seat 4 are mounted on a floor 2 of a body of a vehicle 200. Each of the front seats 3, 3 is mounted on cross members 6, 7 at a position between one of right and left side sills 5, 5 which are disposed on respective right and left lateral sides of the floor 2 to extend in a frontward/rearward, i.e., longitudinal, direction of the vehicle body, and a floor tunnel 2a formed in a laterally central region of the floor 2 to extend in the longitudinal direction.

The following description will be primarily made about the left seat 3 (on the right side in FIG. 12).

In the fifth embodiment, each of a pair of right and left upper rails 42, 42 is fixedly attached to a longitudinally-extending lower flange 11a of a corresponding one of right (remote) and left (adjacent) side frames 11, 11. Each of a pair of right and left lower rails 41, 41 has a front end fixed onto an upper surface of the cross member 6 by a bolt and a nut. The left lower rail 41 (on the right side in FIG. 14) has a rear end fixed onto an upper wall of the cross member 7 through a bracket 141 which extends in a width, i.e., lateral, direction of the vehicle body. The right lower rail 41 (on the left side in FIG. 14) has a rear end fixed to a lateral wall of the floor tunnel 2a through a bracket 142 which extends in the longitudinal direction of the vehicle body.

The bracket 141 on the left side of the vehicle 200 (on the right side in FIG. 14) has an inward end with an upper surface which is fixedly pre-welded to a bottom surface of the lower rail 41 on the left side of the vehicle 200 in a stage before a process of assembling the front seat 3 to the vehicle body, and an outward end which is fixed onto the upper wall of the cross member 7 by a bolt and a nut during the process of assembling the front seat 3 to the vehicle body.

Figure 13:
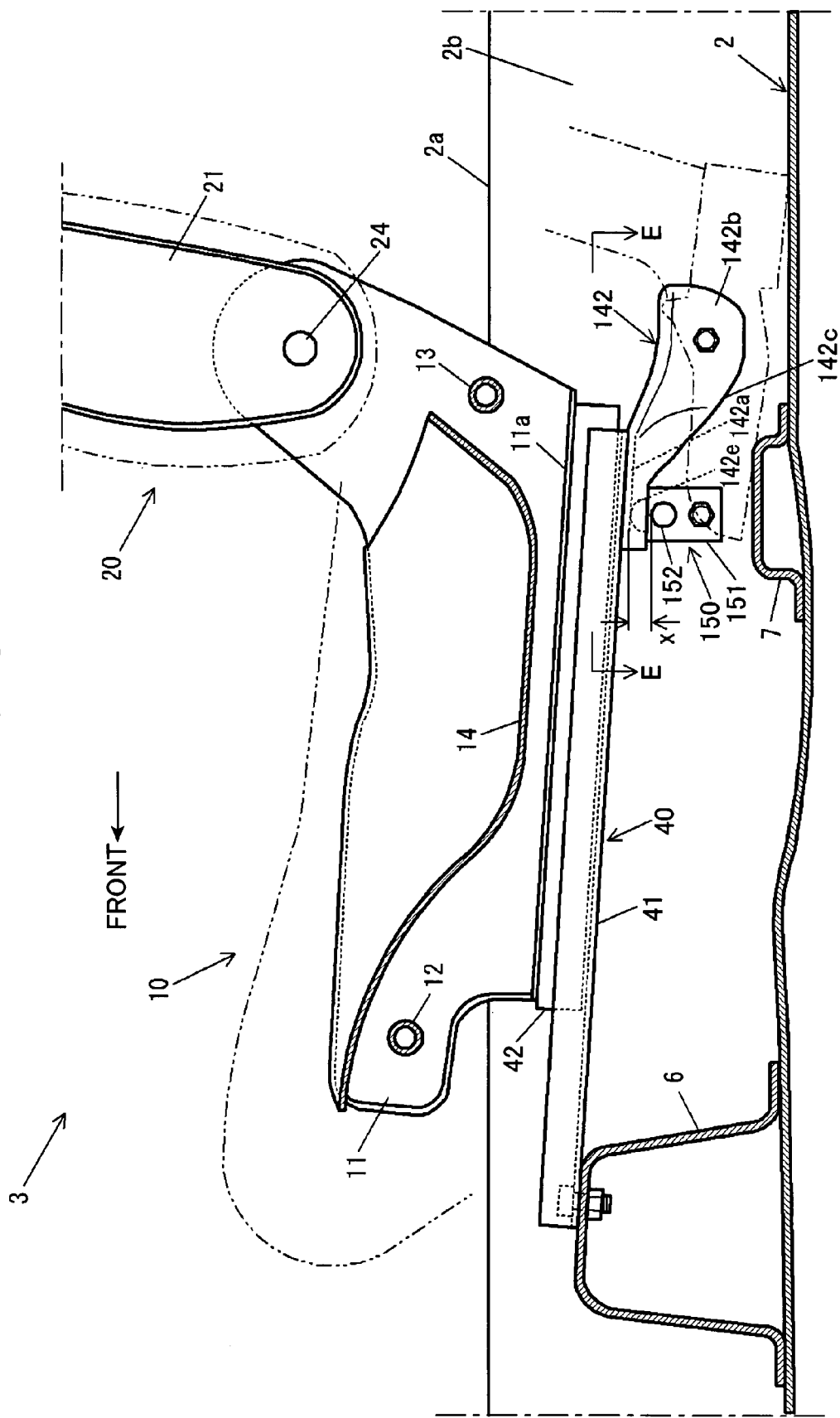
FIG. 13 is a sectional view taken along the line C-C in FIG. 12.

The bracket 142 on the right side of the vehicle 200 (on the left side in FIG. 14) has a front portion including a horizontal wall 142a with an upper surface which is fixedly pre-welded to a bottom surface of the lower rail 41 on the right side of the vehicle 200 in a stage before the process of assembling the front seat 3 to the vehicle body, and a rear portion including a vertical wall 142b which is fixed to the lateral wall of the floor tunnel 2a by a bolt and a nut during the process of assembling the front seat 3 to the vehicle body. As best shown in FIG. 13, the horizontal wall 142a in the front portion of the bracket 142 is fixedly welded to the bottom surface of the lower rail 41 to allow the rear portion of the bracket 142 to extend rearwardly beyond a rear edge of a seat cushion 10.

Figure 14:
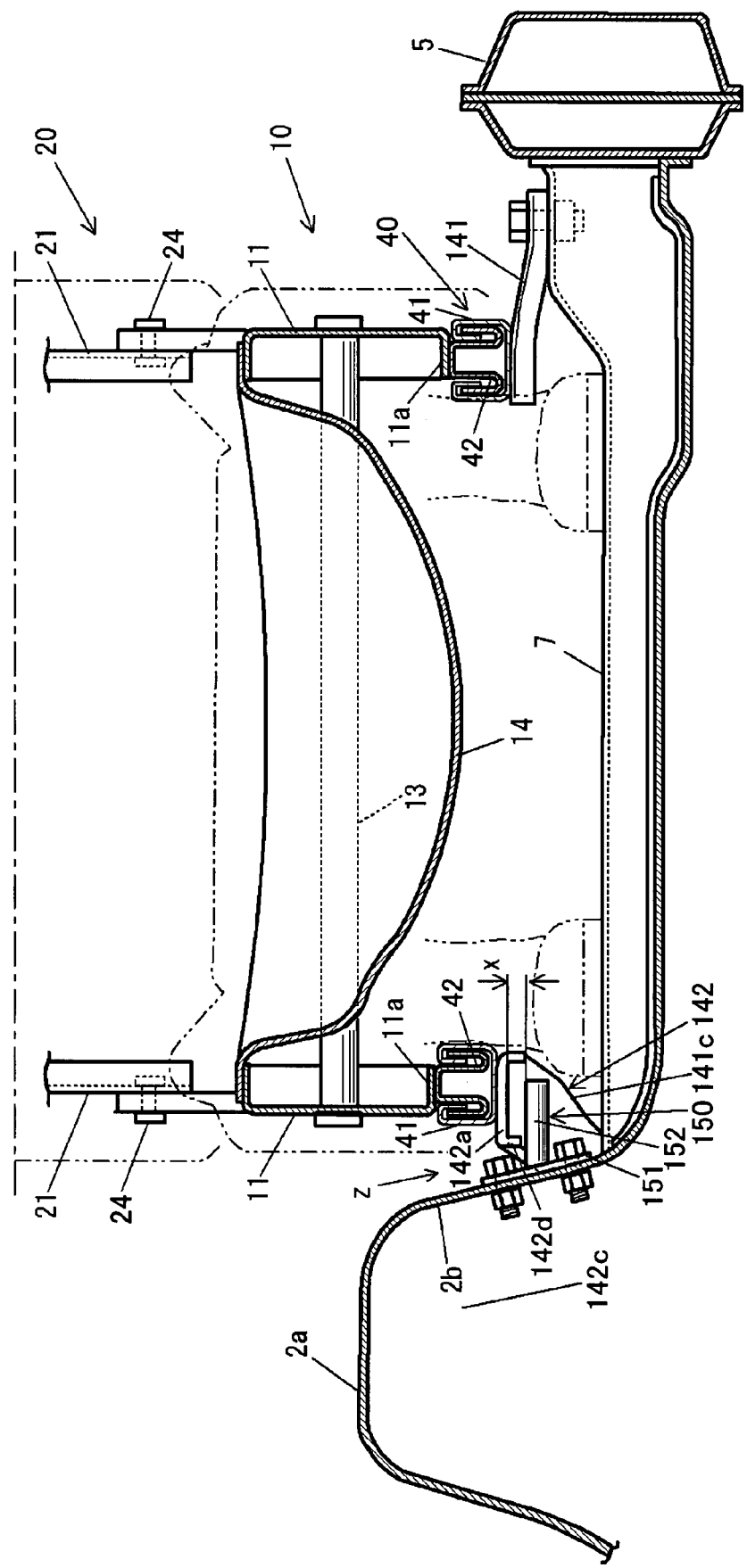
FIG. 14 is a sectional view taken along the line D-D in FIG. 12.

As best shown in FIG. 14, when viewed rearwardly from a front end of the vehicle 200, the bracket 142 is downwardly inclined to allow the lower end (i.e., vertical wall) 142b fixed to the lateral wall of the floor tunnel 2a to be spaced apart from the seat cushion 10 in the lateral direction relative to the upper end (i.e., horizontal wall) 142a fixed to the lower rail 41 of the seat cushion 10, so that an inner (relative to the front seat 3) edge 142c is inclined to be gradually spaced apart from a longitudinal center line of the front seat 3 toward the lower end 142b.

The above structure is likely to cause the following problem. When a large rearward load is imposed on a seat back 20 in the event of a rear collision, the load is applied as a downward load to a rear portion of the seat cushion 10 through right and left support shafts 24, 24. In this case, the bracket 142 having a longitudinally-extending shape is more likely to cause a deformation, specifically a downward bending, in the front portion thereof, and thereby the rear portion of the seat cushion 10 is likely to be largely displaced downwardly.

From this point of view, in the fifth embodiment, a stopping member 150 is disposed below the front portion of the bracket 142 to stop a deformation and a resulting downward displacement of the bracket 142 so as to suppress a downward displacement of the rear portion of the seat cushion 10.

Figure 15:
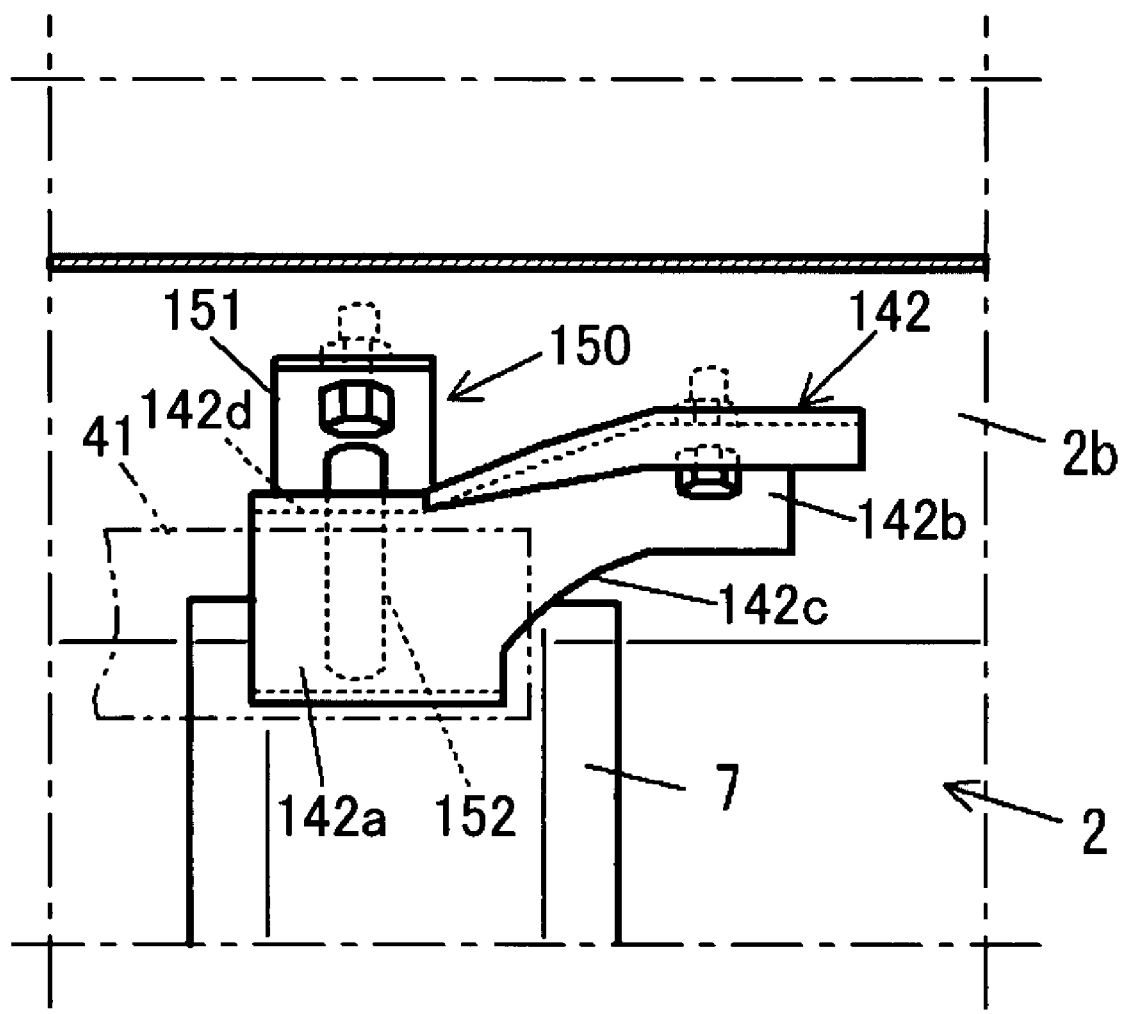
FIG. 15 is a sectional view taken along the line E-E in FIG. 13.

As shown in FIGS. 13 to 15, the stopping member 150 comprises an anchor plate 151 fixed to the lateral wall 2b of the floor tunnel 2a, and a rod 152 having one end welded to the anchor plate 151. The rod 152 is arranged at a height position spaced apart from an upper surface of the floor 2 by a predetermined distance to prevent a rear-seat occupant from being hindered from putting his/her foot in a space between the rod 152 and the upper surface of the floor (upper surface of the cross member 7).

The bracket 142 has a flange-shaped vertical wall 142d extending downwardly from an inward edge of the front portion thereof. The vertical wall 142d is formed with an engagement portion 142e consisting of a semicircular-shaped notch located above and in opposed relation to the rod 152. The notch of the engagement portion 142e is formed such that an upper end thereof reaches a bottom surface of the horizontal wall 142a.

As shown in FIG. 14, the bracket 142 and the rod 152 are arranged to have a predetermined distance "x" between the bottom surface of the horizontal wall 142a of the bracket 142 and an upper surface of the rod 152. This arrangement is intended to allow the horizontal wall 142a of the bracket 142 to be slightly deformed before coming into contact with the rod 152 when a downward load is applied to the rear portion of the seat cushion 10 during a rear collision, so as to partially absorb the load to reduce a load to be applied to the rod 152 and thereby facilitate reduction in size of the rod 152. Further, if the bracket 142 and the rod 152 are arranged in a contact state or with almost no distance therebetween, contact therebetween due to vehicle vibration or the like is likely to cause the occurrence of abnormal noise or the like. The above arrangement is also intended to avoid this problem.

An operation of the vehicle seat structure according to the fifth embodiment will be described below.

In the fifth embodiment, the stopping member 150 is disposed below the front portion of the bracket 142. Thus, when a rearward load is input into the seat back 20 and thereby the seat cushion 10 is just about to be displaced downwardly due to a deformation of the bracket, the horizontal wall 142a in the front portion of the bracket 142 comes into contact with the rod 152 to suppress a further downward displacement of the seat cushion 10. Further, in conjunction with the contact, the engagement portion 142e is engaged with the rod 152. Thus, even if a downward load is further applied to the seat cushion 10, the engagement between the bracket 142 and the rod 152 will be maintained, for example, without a sliding movement in the longitudinal direction, to reliably suppress a downward displacement of the seat cushion 10.

An occupant seated in the rear seat 4 occasionally puts his/her foot in a space below the rear portion of the seat cushion 10 of the front seat 3. In the fifth embodiment, the bracket 142 is inclined to allow the lower end fixed to the vehicle body to be spaced apart from the seat cushion 10 in the lateral direction relative to the upper end fixed to (the lower rail 41 of the slide mechanism 40 of) the seat cushion 10, and the rod 152 of the stopping member 150 is arranged at a height position spaced apart from the upper surface of the floor 2 (cross member 7) facing the bottom of the bracket 142 by a predetermined distance, to extend laterally from the lateral wall 2b of the floor tunnel 2a located on a laterally lower side of the seat cushion 10 and in approximately parallel relation to a lateral surface of the vehicle body. Thus, the space below the rear portion of the seat cushion 10 can have a relatively large lateral length to allow a rear-seat occupant to desirably put his/her feet in the space over a laterally wide range.

The rear portion of the bracket 142 has the vertical wall 142d which is parallel to and attachable to the lateral wall 2b of the floor tunnel 2a. Thus, as compared with a structure where the rear portion of the bracket 142 is mounted on a horizontal portion of the floor 2 on a lateral side of the floor tunnel 2a, the vertical wall 142d makes it possible to ensure a larger foot space without reducing a horizontal surface allowing a foot of a rear-seat occupant to be placed thereon. In addition, a distance "z" (see FIG. 14) between a lateral surface of the seat cushion 10 and the lateral wall 2b of the floor tunnel 2a can be reduced to provide enhanced appearance to this area.

If the entire bracket 142 is located below the seat cushion 10, an operator has to put his/her hand in a narrow space between the seat cushion 10 and the floor 2 during an operation of fastening the bracket 142 to the vehicle body by a bolt and a nut, resulting in poor operating efficiency.

In the fifth embodiment, the bracket 142 is formed as a longitudinally-extending member which is designed to be fixedly attached to the bottom surface of the lower rail 41 at the front portion thereof in the stage before the process of assembling the front seat 3 to the vehicle body, while allowing the rear portion thereof to extend rearwardly beyond the rear edge of the seat cushion 10, and fixed to the lateral wall 2b of the floor tunnel 2a at the rear portion thereof during the process of assembling the front seat 3 to the vehicle body. Thus, in the operation of fixing the seat cushion 10 to the vehicle body through the bracket 142, the rear portion of the bracket 142 can be fastened to the lateral wall 2b by a bolt and a nut with enhanced operation efficiency without the need for putting operator's hand in the narrow space between the seat cushion 10 and the floor 2. The stopping member 150 is formed as an independent member to be located below the bracket 142. Thus, the stopping member 150 can be fixed to the floor tunnel 2a before the operation of fixing the seat cushion 10 to the vehicle body.

Sixth Embodiment

A vehicle seat structure according to a sixth embodiment of the present invention will be described below.

Figure 16:
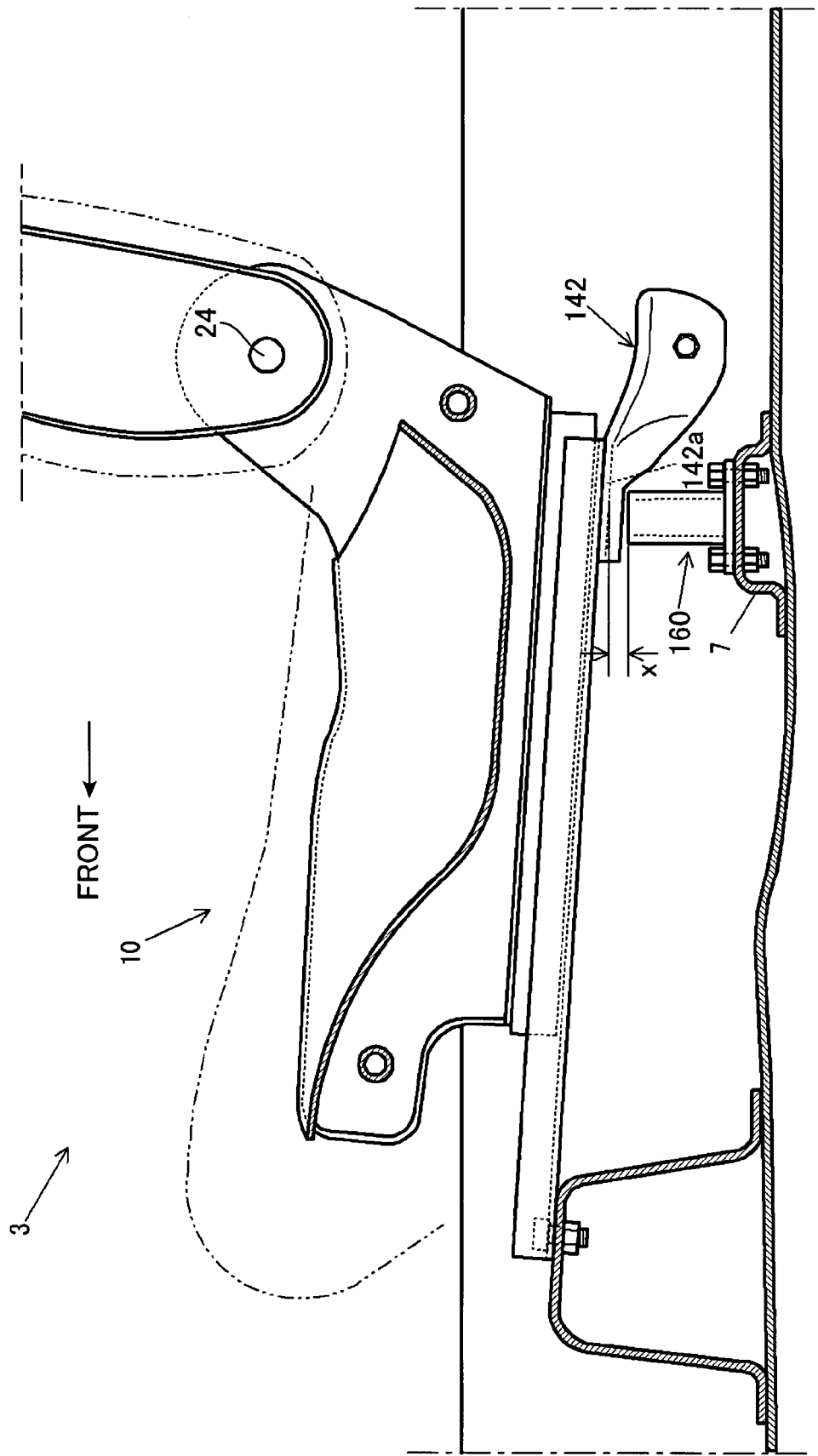
FIG. 16 is a sectional view showing a vehicle seat structure according to a sixth embodiment of the present invention, which corresponds to FIG. 13.

As shown in FIG. 16, in the vehicle seat structure according to the sixth embodiment, a closed-section member (stopping member) 160 having a closed section in horizontal sectional view is fixed onto an upper surface of a cross member 7 at a position below a bracket 142 to serve as a downward displacement suppression device. The closed-section member 160 and the bracket 142 are arranged to have a predetermined distance "x" between a bottom surface of a horizontal wall 142a in a front portion of the bracket 142 and an upper edge of the closed-section member 160.

In the vehicle seat structure according to the sixth embodiment, when the front portion of the bracket 142 is deformed and thereby a rear portion of a front seat 3 is just about to be displaced downwardly, the front portion of the bracket 42 comes into contact with the upper edge of the closed-section member 160 to prevent a further downward displacement in the same manner as that in the fifth embodiment. In particular, the stopping member 160 having a closed section can further reliably suppress the downward displacement of the seat cushion 10.

In the fifth and sixth embodiments, the rod-type stopping member 150 and the closed-section stopping member 160 are provided as a downward displacement suppression device. Alternatively, a wall thickness of the bracket 142 may be increased to provide stiffness enough to suppress a deformation thereof. This can also suppress a downward displacement of the seat cushion 10 to be caused by a deformation of the bracket 142.

In the fifth and sixth embodiment, the present invention has been described based on an example where a seat mounting member, such as the bracket 142, is attached to the lateral wall 2b of the floor tunnel 2a. Alternatively, the present invention may be applied to a seat mounting bracket to be attached to the side sill 5. Further, when right and left seat mounting members are designed to have the same shape, such as the bracket 142, the present invention may be applied to not only one of the mounting members but also both the mounting members.

As described above, the present invention basically provides a vehicle seat structure which comprises a seat cushion, a seat back connected to a rear end of the seat cushion, and a downward displacement suppression device operable, when a rearward load is input into the seat back, to suppress a downward displacement of the seat cushion. In the present invention, the vehicle seat structure provided with the downward displacement suppression device makes it possible to suppress a downward displacement of the seat cushion even if a rearward load is input into the seat back.

In a preferred embodiment, when the vehicle seat structure further includes a lifter mechanism which supports the seat cushion relative to a vehicle body and allows a height position of the seat cushion to be adjusted relative to the vehicle body, the downward displacement suppression device is operable, when a rearward load is input into the seat back, to suppress a downward displacement of the seat cushion due to the lifter mechanism.

In a particularly preferred embodiment, the lifter mechanism includes a rear link member which has an upper end connected to a rear portion of the seat cushion and a lower end connected relative to the vehicle body. The lifter mechanism is designed to position the rear link member in a rearwardly inclined posture or a rearwardly extending posture when the seat cushion is adjusted to a lowermost position. Further, the downward displacement suppression device is adapted to prevent the rear link member from being further inclined rearwardly so as to suppress the downward displacement of the seat cushion. According to this embodiment, when the seat cushion is adjusted to a higher position, it can be moved frontwardly to provide enhanced seat position adjustability for an occupant having a relatively small build. While this structure is more likely to cause an increase in rearward inclination of the rear link member when a rearward load is input into the seat back, the downward displacement suppression device in the present invention can prevent the rear link member from being further inclined rearwardly so as to suppress a downward displacement of the seat cushion.

In a preferred embodiment, the downward displacement suppression device includes a swingable member supported by a rear lower portion of the seat cushion swingably in a frontward/rearward direction of a vehicle body. The swingable member is designed to be swingingly moved and positioned in an approximately vertical direction when a rearward load is input into the seat back, so as to serve as a shoring rod between the seat cushion and the vehicle body. According to this embodiment, the downward displacement suppression device can be practically obtained in a simplified structure.

In a preferred embodiment, the downward displacement suppression device includes a shock-absorbing device adapted to suppress a rapid downward displacement of the seat cushion. According to this embodiment, while the seat cushion is likely to be rapidly displaced downwardly due to a downward load caused by a rearward load input into the seat back, the shock-absorbing device can absorb the load to suppress a downward displacement of the seat cushion.

In a particularly preferred embodiment, the lifter mechanism includes a rear link member which has an upper end connected to a rear portion of the seat cushion and a lower end connected relative to the vehicle body, and the shock-absorbing device is associated with the rear link member to suppress the rapid downward displacement of the seat cushion. According to this embodiment, the seat cushion is moved frontwardly when it is adjusted to an upper position, and moved rearwardly when it is adjusted to a lower position, so as to set the seat cushion at a sitting position suitable for a physical size of an occupant. In addition, the shock-absorbing device is associated with the rear link member to suppress the rapid downward displacement of the seat cushion. Thus, while the rear link member is likely to be rotated in conjunction with a downward displacement of the seat cushion due to a downward load caused by a rearward load input into the seat back, the shock-absorbing device can effectively absorb the load.

In another preferred embodiment, the lifter mechanism includes a parallel linkage comprising the rear link member and a front link member which has an upper end connected to a front portion of the seat cushion and a lower end connected relative to the vehicle body.

In a preferred embodiment, the lifter mechanism includes an operating section adapted to manually adjust the height position of the seat cushion relative to the vehicle body, and the downward displacement suppression device is designed to exert no influence on an operating force of the operating section. In cases where the vehicle seat structure is equipped with the lifter mechanism together with the operating section adapted to manually adjust the height position of the seat cushion relative to the vehicle body, the downward displacement suppression device has to be incorporated in the vehicle seat structure without causing deterioration in operational performance of the operating section. In this regard, the downward displacement suppression device in this embodiment is designed to exert no influence on an operating force of the operating section. This makes it possible to desirably suppress a downward displacement of the seat cushion without causing deterioration in operational performance of the operating section.

In a preferred embodiment, the lifter mechanism includes a retention mechanism unit adapted to restrict a change in posture of the rear link member so as to serve as means for keeping the seat cushion at a post-adjustment height position relative to the vehicle body. The retention mechanism unit is disposed on one of opposite lateral sides of the seat cushion, and the downward displacement suppression device is disposed on the other lateral side of the seat cushion. In cases where the lifter mechanism is provided with the retention mechanism unit which is adapted to restrict a rotation of the rear link member so as to serve as means for keeping the seat cushion at a post-adjustment height position relative to the vehicle body, and disposed on one of opposite lateral sides of the seat cushion, the retention mechanism unit generally provides relatively high stiffness to the seat cushion, and therefore the one lateral side of the seat cushion has a higher resistance to downward displacement as compared with the other lateral side of the seat cushion. Thus, the downward displacement suppression device has to be arranged while taking account of this point. In this embodiment, considering that the one lateral side having the retention mechanism unit has a lower risk of downward displacement as compared with the other lateral side, the downward displacement suppression device is arranged only on the other lateral side where a relatively large downward displacement is likely to occur. This makes it possible to suppress a downward displacement of the seat cushion with a desirable balance between right and left sides and in an efficient manner without providing the downward displacement suppression device to both the lateral sides.

In a preferred embodiment, the seat cushion has a rear portion fixed to a vehicle body through a mounting member, and the downward displacement suppression device is operable to suppress a deformation of the mounting member which occurs when a rearward load is input into the seat back. According to this embodiment, the downward displacement suppression device can suppress a downward movement of the seat cushion in conjunction with a deformation of the mounting member due to a downward load caused by a rearward load input into the seat back.

In a preferred embodiment, the downward displacement suppression device includes a stopping member adapted to stop a downward displacement of the mounting member. The stopping member can stop a downward displacement of the mounting member so as to reliably suppress a downward displacement of the seat cushion. In the present invention, the downward displacement suppression device includes a mounting member having stiffness enough to suppress a downward deformation itself, for example, by increasing a wall thickness thereof In a preferred embodiment, the mounting member has an upper end fixed to the seat cushion and a lower end fixed to a vehicle body. The mounting member is inclined to allow the lower end to be spaced apart from the seat cushion in a lateral direction of the vehicle body relative to the upper end. Further, the stopping member is disposed below the upper end of the mounting member and above a floor surface of the vehicle body by a predetermined distance to extend in the lateral direction from a vehicle body-forming wall located on a laterally lower side of the seat cushion and in approximately parallel relation to a lateral surface of the vehicle body. In cases where an occupant seated in a seat behind the seat cushion occasionally puts his/her foot in a space below the seat cushion, the mounting member and/or the stopping member are likely to hinder such an action, depending on a shape and/or arrangement thereof. In this embodiment, a space for receiving occupant's feet can be ensured below the seat cushion with an increased lateral length to allow an occupant to desirably put his/her feet in the space.

In a preferred embodiment, the lower end of the mounting member has a wall which is parallel to and attachable to the vehicle body-forming wall. According to this embodiment, as compared with a structure where the rear portion of the bracket is mounted on a floor surface below the seat cushion, the vertical wall makes it possible to ensure a larger foot space without reducing a horizontal surface allowing occupant's foot to be placed thereon. In addition, a distance between a lateral surface of the seat cushion and the vehicle body-forming wall mounting thereon the lower end of the mounting member can be reduced to provide enhanced appearance to this area.

In a preferred embodiment, the mounting member is formed to extend in a frontward/rearward direction of the vehicle body. The mounting member has a front portion fixed to a bottom surface of the seat cushion, and a rear portion formed to extend rearwardly beyond a rear edge of the seat cushion and fixed to the vehicle body-forming wall. Further, the stopping member is disposed below the front portion of the mounting member. If the entire bracket is located below the seat cushion, an operator has to put his/her hand in a narrow space between the seat cushion and the floor during an operation of fastening the bracket to the vehicle body by a bolt and a nut, resulting in poor operating efficiency. According to this embodiment, in an operation of fixing the seat cushion to the vehicle body through the bracket, the bracket can be fastened to the vehicle body by a bolt and a nut with enhanced operation efficiency without the need for putting operator's hand in the narrow space between the seat cushion and the floor. In addition, the stopping member is formed as an independent member to be located below the bracket. Thus, the stopping member can be fixed to the vehicle body before the operation of fixing the seat cushion to the vehicle body.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

This application is based on Japanese Patent Application Serial Nos. 2006-160586, 2006-172447, and 2006-246429, filed in Japan Patent Office on, respectively, Jun. 9, 2006, Jun. 22, 2006, and Sep. 12, 2006, the contents of which are hereby incorporated by reference.

What is claimed is:

1. A vehicle seat structure comprising:
   a seat cushion;
   a seat back connected to a rear end of said seat cushion;
   a lifter mechanism which supports said seat cushion relative to a vehicle body and allows a height position of the seat cushion to be adjusted relative to the vehicle body; and
   a downward displacement suppression device operable, when a rearward and downward load is input into said seat back, to suppress a downward displacement of said seat cushion,
   wherein said downward displacement suppression device includes a shock-absorbing device adapted to suppress a rapid downward displacement of said seat cushion, and said lifter mechanism includes a rear link member, said rear link member having a lower end connected to the vehicle body, an upper portion connected to the rear portion of said seat cushion, and an upper end, and
   said shock-absorbing device is directly connected to said upper end of said rear link member to suppress said rapid downward movement of said seat cushion.

2. The vehicle seat structure according to claim 1, wherein said rear link member has a curved portion between the lower end and the upper end of the rear link member.

3. The vehicle seat structure according to claim 1, wherein said rear link member is approximately L shape as seen from a side view thereof.

4. The vehicle seat structure according to claim 1, wherein said shock-absorbing device including:
   a longitudinal link member having one end connected to the upper end of the rear link member and a second end thereof, said longitudinal link member providing the direct connection between said shock absorbing device and said upper end of said rear link member;
   a gear member, mounted on said seat cushion, which is operatively connected with the second end of the longitudinal link member;
   a rotary damper, mounted on said seat cushion, having a gear portion which is in mesh with said gear member, said rotary damper being filled with an oil which produces a viscous resistance in response to a rotation of said gear portion, and
   wherein said rotary damper produces a viscous resistance when the rear link member is driven downward and rearward due to a rear ended collision, which pulls said longitudinal link member in a rearward direction, resulting in rotation of said gear member which is in mesh with said gear portion of the rotary damper so that said rapid downward movement of the seat cushion is suppressed.

5. The vehicle seat structure according to claim 4, wherein said upper portion is a midpoint of the rear link member between the lower end and the upper end and said shock-absorbing device is connected to the upper end of the rear link member.

6. A vehicle seat structure, comprising:
   a seat cushion;
   a seat back connected to a rear end of said seat cushion;
   a lifter mechanism which supports said seat cushion relative to a vehicle body and allows a height position of the seat cushion to be adjusted relative to the vehicle body; and
   a downward displacement suppression device operable, when a rearward and downward load is input into said seat back, to suppress a downward displacement of said seat cushion,
   wherein said downward displacement suppression device includes a shock-absorbing device adapted to suppress a rapid downward displacement of said seat cushion, and said lifter mechanism includes a rear link member having a lower end connected to the vehicle body and an upper portion connected to the rear portion of said seat cushion, and
   wherein said shock-absorbing device is mechanically connected to an upper end of said rear link member to suppress said rapid downward movement of said seat cushion regardless of the height position of the seat cushion adjusted by said lifter mechanism.

* * * * *